United States Patent
Rico Alvarino et al.

(10) Patent No.: US 11,690,082 B2
(45) Date of Patent: *Jun. 27, 2023

(54) CAPABILITY AND COVERAGE DETERMINATION FOR MULTIMEDIA BROADCAST MULTICAST SERVICE

(71) Applicant: QUALCOMM Incorporated, San Diego, CA (US)

(72) Inventors: Alberto Rico Alvarino, San Diego, CA (US); Miguel Griot, La Jolla, CA (US); Kapil Bhattad, Bangalore (IN); Haris Zisimopoulos, London (GB); Lenaig Genevieve Chaponniere, La Jolla, CA (US); Mungal Singh Dhanda, Slough (GB)

(73) Assignee: QUALCOMM Incorporated, San Diego, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 17/326,235

(22) Filed: May 20, 2021

(65) Prior Publication Data

US 2021/0274469 A1 Sep. 2, 2021

Related U.S. Application Data

(63) Continuation of application No. 16/476,160, filed as application No. PCT/US2017/057967 on Oct. 24, 2017, now Pat. No. 11,019,602.

(30) Foreign Application Priority Data

Feb. 6, 2017 (IN) .............................. 201741004261

(51) Int. Cl.
*H04W 28/00* (2009.01)
*H04W 72/30* (2023.01)
(Continued)

(52) U.S. Cl.
CPC ....... *H04W 72/30* (2023.01); *H04W 28/0205* (2013.01); *H04W 72/51* (2023.01); *H04W 72/543* (2023.01)

(58) Field of Classification Search
CPC ............. H04W 72/087; H04W 72/048; H04W 28/0205; H04W 72/005
See application file for complete search history.

(56) References Cited

U.S. PATENT DOCUMENTS 9,072,005 B2 6/2015 Walker et al.
9,173,192 B2 10/2015 Zhang et al.
(Continued)

FOREIGN PATENT DOCUMENTS

CN 101193342 A 6/2008
CN 101502046 A 8/2009
(Continued)

OTHER PUBLICATIONS

Awada, et al., "Field Trial of LTE eMBMS Network for TV Distribution: Experimental Results and Analysis"; IEEE Transactions on Broadcasting, vol. 63, No. 2, Jun. 2017.
(Continued)

*Primary Examiner* — Benjamin H Elliott, IV
(74) *Attorney, Agent, or Firm* — QUALCOMM Incorporated

(57) ABSTRACT

Methods, systems, and devices for wireless communication are described. Some wireless communications systems may support a determination of user equipment (UE) capabilities, such as a category or a coverage level for broadcast or multicast content. In some cases, a radio interface may be configured to account for an indicated capability of a target UE. For example, a base station may receive an indication of a capability of a particular targeted UE. The capability of the targeted UE may be specified by a service provider to (Continued)

deliver multicast or broadcast content, and subsequently associated with a radio interface between the base station and the target UE. The radio interface may then be configured based on the indicated capability of the target UE, for example, by configuring a transport block size or bandwidth. The base station may then transmit broadcast or multicast content to the UE using the configured radio interface.

20 Claims, 17 Drawing Sheets

(51) Int. Cl.
*H04W 28/02* (2009.01)
*H04W 72/51* (2023.01)
*H04W 72/543* (2023.01)

(56) References Cited

U.S. PATENT DOCUMENTS

| | | | |
|---|---|---|---|
| 11,019,602 B2* | 5/2021 | Rico Alvarino | ...... H04L 12/189 |
| 2006/0156370 A1 | 7/2006 | Parantainen | |
| 2008/0004054 A1 | 1/2008 | Barbaresi et al. | |
| 2009/0185522 A1 | 7/2009 | Periyalwar et al. | |
| 2009/0323599 A1 | 12/2009 | Lee et al. | |
| 2010/0128649 A1 | 5/2010 | Gonsa et al. | |
| 2011/0194428 A1 | 8/2011 | Wang et al. | |
| 2012/0155282 A1 | 6/2012 | Dorenbosch | |
| 2012/0224564 A1 | 9/2012 | Paisal et al. | |
| 2012/0300688 A1 | 11/2012 | Gholmieh et al. | |
| 2013/0083661 A1 | 4/2013 | Gupta et al. | |
| 2013/0294321 A1 | 11/2013 | Wang et al. | |
| 2014/0098745 A1 | 4/2014 | Balsubramanian et al. | |
| 2014/0198707 A1 | 7/2014 | Wang et al. | |
| 2014/0372624 A1 | 12/2014 | Wang et al. | |
| 2015/0071160 A1 | 3/2015 | Zeng et al. | |
| 2015/0109987 A1 | 4/2015 | Wang et al. | |
| 2015/0119023 A1 | 4/2015 | Wang et al. | |
| 2015/0222678 A1 | 8/2015 | Zhang | |
| 2015/0223028 A1 | 8/2015 | Wang et al. | |
| 2016/0021516 A1 | 1/2016 | Han | |
| 2016/0119395 A1 | 4/2016 | Li et al. | |
| 2016/0227486 A1 | 8/2016 | Park | |
| 2016/0323846 A1 | 11/2016 | Park et al. | |
| 2016/0374050 A1 | 12/2016 | Prasad et al. | |
| 2017/0055226 A1 | 2/2017 | Park | |
| 2017/0164372 A1 | 6/2017 | Gupta et al. | |
| 2018/0026733 A1 | 1/2018 | Yang et al. | |
| 2018/0145839 A1 | 5/2018 | Lee et al. | |
| 2018/0316460 A1 | 11/2018 | Navratil et al. | |
| 2018/0317218 A1 | 11/2018 | Li et al. | |
| 2019/0116402 A1 | 4/2019 | Long | |
| 2019/0223156 A1 | 7/2019 | Fujishiro et al. | |
| 2019/0349892 A1 | 11/2019 | Rico Alvarino et al. | |
| 2019/0364492 A1 | 11/2019 | Azizi et al. | |
| 2021/0274469 A1* | 9/2021 | Rico Alvarino | .... H04W 72/087 |

FOREIGN PATENT DOCUMENTS

| | | |
|---|---|---|
| CN | 102932744 A | 2/2013 |
| CN | 103561389 A | 2/2014 |
| CN | 104247470 A | 12/2014 |
| CN | 103535093 B | 10/2017 |
| EP | 2281402 B1 | 3/2012 |
| WO | WO2012125976 A2 | 9/2012 |
| WO | WO-2012145647 A1 | 10/2012 |

OTHER PUBLICATIONS

International Preliminary Report on Patentability—PCT/US2017/057967, The International Bureau of WIPO—Geneva, Switzerland, dated Aug. 15, 2019.

International Search Report and Written Opinion—PCT/US2017/057967—ISA/EPO—dated Jan. 30, 2018.

LG Electronics Inc: "MBMS Access Based on Required UE Radio Access Capability", 3GPP Draft; R2-030909 MBMS Access, 3rd Generation Partnership Project (3GPP), Mobile Competence Centre; 650, Route Des Lucioles; F-06921 Sophia-Anti Polls Cedex; France, vol. RAN WG2, No. Paris, France; May 13, 2003, XP050141564, [retrieved on May 13, 2003], 5 pages.

Samsung: "Solution for Key Issue #6: Exposure of eMBMS Service and Transport Capabilities to 3rd Party", 3GPP Draft; S2-163948, Revision of S2-163715, 3rd Generation Partnership Project (3GPP), Mobile Competence Centre; 650, Route Des Lucioles; F-06921 Sophia-Anti Polls Cedex; France, vol. SA WG2, No. Vienna, Austria; Jul. 13, 2016, XP051118361, Retrieved from the Internet: URL:http://www.3gpp.org/ftp/Meetings_3GPP_SYNC/SA2/Docs/ [retrieved on Jul. 13, 2016], 6 pages.

Siemens: "Considerations on Minimum UE Capabilities for MBMS", 3GPP Draft, 3GPP TSG-RAN Working Group 2 Meeting #40, R2-040041, 3rd Generation Partnership Project (3GPP), Mobile Competence Centre; 650, Route Des Lucioles; F-06921 Sophia-Anti Polls Cedex; France, vol. RAN WG2, No. Sophia Antipolis, France; Jan. 12-16, 2004, Jan. 19, 2004, XP050125057, [retrieved on Jan. 19, 2004], 3 pages.

Siemens: "UE Capabilities Parameters for MBMS", 3GPP TSG-RAN Working Group 2 Meeting #41, R2-040527, Malaga, Spain, Feb. 16-20, 2004, 3 pages.

\* cited by examiner

CAPABILITY AND COVERAGE DETERMINATION FOR MULTIMEDIA BROADCAST MULTICAST SERVICE

CROSS REFERENCES

The present application for Patent is a Continuation of U.S. patent application Ser. No. 16/476,160 by Rico Alvarino et al., entitled "CAPABILITY AND COVERAGE DETERMINATION FOR MULTIMEDIA BROADCASE MULTICAST SERVICE" filed Jul. 5, 2019, which is a 371 national phase filing of International Application No. PCT/US2017/057967 to Rico Alvarino et al., entitled "CAPABILITY AND COVERAGE DETERMINATION FOR MULTIMEDIA BROADCAST MULTICAST SERVICE", filed Oct. 24, 2017, which claims priority to Indian Patent Application No. 2017/41004261 by Rico Alvarino et al., entitled "CAPABILITY AND COVERAGE DETERMINATION FOR MULTIMEDIA BROADCAST MULTICAST SERVICE," filed Feb. 6, 2017, assigned to the assignee hereof, and which is hereby expressly incorporated by reference herein in its entirety.

BACKGROUND

The following relates generally to wireless communication, and more specifically to capability and coverage determination for multimedia broadcast multicast services.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless communications systems that support multicast and/or broadcast transmissions, different UEs may have various capabilities, such as being able to support a certain bandwidth or maximum transport block (TB) size over a radio interface with a base station. Thus, when a UE with different capabilities is added to the field, the newly added UE may not support the same capabilities as are being used by other connected UEs. In such cases, it may be desirable to implement techniques to configure radio resources to accommodate a range of UE capabilities.

SUMMARY

The described techniques relate to improved methods, systems, devices, or apparatuses that support determining UE capabilities, such as a category or a coverage level for broadcast or multicast content (e.g., content provided using a Multimedia Broadcast Multicast Service (MBMS)). Generally, the described techniques provide for configuring a radio interface to account for an indicated capability of a target UE. For example, a base station may receive an indication of a capability of a particular targeted UE. The capability of the targeted UE may be specified by a service provider to deliver MBMS content, and subsequently associated with a radio interface between the base station and the target UE. The radio interface may then be configured based at least in part on the indicated capability of the target UE, for example, by configuring a transport block size or bandwidth. The base station may then transmit broadcast or multicast content to the UE using the configured radio interface.

A method of wireless communication is described. The method may include receiving an indication of a targeted UE capability, the targeted UE capability specified by a service provider for the delivery of broadcast or multicast content and associated with a radio interface between the base station and a UE, configuring the radio interface based at least in part on the received indication of the targeted UE capability, and transmitting the broadcast or multicast content to the UE using the configured radio interface.

An apparatus for wireless communication is described. The apparatus may include means for receiving an indication of a targeted UE capability, the targeted UE capability specified by a service provider for the delivery of broadcast or multicast content and associated with a radio interface between the base station and a UE, means for configuring the radio interface based at least in part on the received indication of the targeted UE capability, and means for transmitting the broadcast or multicast content to the UE using the configured radio interface.

Another apparatus for wireless communication is described. The apparatus may include a processor, memory in electronic communication with the processor, and instructions stored in the memory. The instructions may be operable to cause the processor to receive an indication of a targeted UE capability, the targeted UE capability specified by a service provider for the delivery of broadcast or multicast content and associated with a radio interface between the base station and a UE, configure the radio interface based at least in part on the received indication of the targeted UE capability, and transmit the broadcast or multicast content to the UE using the configured radio interface.

A non-transitory computer readable medium for wireless communication is described. The non-transitory computer-readable medium may include instructions operable to cause a processor to receive an indication of a targeted UE capability, the targeted UE capability specified by a service provider for the delivery of broadcast or multicast content and associated with a radio interface between the base station and a UE, configure the radio interface based at least in part on the received indication of the targeted UE capability, and transmit the broadcast or multicast content to the UE using the configured radio interface.

Some examples of the method, apparatus, and non-transitory computer-readable medium described above may further include processes, features, means, or instructions for receiving, from a network node, a category of the UE, the indication of the targeted UE capability comprising the category.

In some examples of the method, apparatus, and non-transitory computer-readable medium described above, the network node comprises a broadcast multicast service center (BMSC), or a MBMS gateway, or a combination thereof.

In some examples of the method, apparatus, and non-transitory computer-readable medium described above, the indication of the targeted UE capability comprises a quality of service (QoS) class identifier (QCI).

Some examples of the method, apparatus, and non-transitory computer-readable medium described above may further include processes, features, means, or instructions for identifying a mapping between the QCI and a maximum bandwidth, or a maximum transport block size, or a combination thereof. Some examples of the method, apparatus, and non-transitory computer-readable medium described above may further include processes, features, means, or instructions for configuring the radio interface based at least in part on the identified mapping.

Some examples of the method, apparatus, and non-transitory computer-readable medium described above may further include processes, features, means, or instructions for receiving, from a network node, one or more temporary mobile group identities (TMGIs), the one or more TMGIs comprising the indication of the targeted UE capability. Some examples of the method, apparatus, and non-transitory computer-readable medium described above may further include processes, features, means, or instructions for determining a category of the UE based at least in part on the received TMGI, the targeted UE capability comprising the determined category.

In some examples of the method, apparatus, and non-transitory computer-readable medium described above, configuring the radio interface based at least in part on the received indication of the targeted UE capability comprises: determining a maximum bandwidth, or a maximum transport block size, or a combination thereof to be used to transmit the broadcast or multicast content.

Some examples of the method, apparatus, and non-transitory computer-readable medium described above may further include processes, features, means, or instructions for receiving, from a network node, an indication of an expected coverage level specified by the service provider. Some examples of the method, apparatus, and non-transitory computer-readable medium described above may further include processes, features, means, or instructions for configuring the radio interface based at least in part on the received indication of the expected coverage level, the received indication of the targeted UE capability including the indication of the expected coverage level.

Some examples of the method, apparatus, and non-transitory computer-readable medium described above may further include processes, features, means, or instructions for transmitting UE reports to a network node. Some examples of the method, apparatus, and non-transitory computer-readable medium described above may further include processes, features, means, or instructions for receiving an updated indication of a targeted UE capability from the network node, the radio interface modified based at least in part on the updated targeted UE capability.

Another method of wireless communication is described. The method may include receiving an indication of a targeted UE capability for the delivery of broadcast or multicast content and associated with a radio interface between the UE and a base station, identifying a supported capability of the UE, and receiving broadcast or multicast content using the radio interface based at least in part on the identified supported capability of the UE and on the targeted UE capability.

Another apparatus for wireless communication is described. The apparatus may include means for receiving an indication of a targeted UE capability for the delivery of broadcast or multicast content and associated with a radio interface between the UE and a base station, means for identifying a supported capability of the UE, and means for receiving broadcast or multicast content using the radio interface based at least in part on the identified supported capability of the UE and on the targeted UE capability.

Another apparatus for wireless communication is described. The apparatus may include a processor, memory in electronic communication with the processor, and instructions stored in the memory. The instructions may be operable to cause the processor to receive an indication of a targeted UE capability for the delivery of broadcast or multicast content and associated with a radio interface between the UE and a base station, identify a supported capability of the UE, and receive broadcast or multicast content using the radio interface based at least in part on the identified supported capability of the UE and on the targeted UE capability.

Another non-transitory computer readable medium for wireless communication is described. The non-transitory computer-readable medium may include instructions operable to cause a processor to receive an indication of a targeted UE capability for the delivery of broadcast or multicast content and associated with a radio interface between the UE and a base station, identify a supported capability of the UE, and receive broadcast or multicast content using the radio interface based at least in part on the identified supported capability of the UE and on the targeted UE capability.

In some examples of the method, apparatus, and non-transitory computer-readable medium described above, the indication of the targeted UE capability may be received from a service provider.

Some examples of the method, apparatus, and non-transitory computer-readable medium described above may further include processes, features, means, or instructions for determining if the supported capability may be compatible with the targeted UE capability, wherein the targeted UE capability may be a UE category or a UE coverage enhancement level. Some examples of the method, apparatus, and non-transitory computer-readable medium described above may further include processes, features, means, or instructions for determining to monitor for the broadcast or multicast content based at least in part on determining that the supported capability may be compatible with the targeted UE capability.

In some examples of the method, apparatus, and non-transitory computer-readable medium described above, the targeted UE capability may be a UE category or a UE coverage enhancement level.

In some examples of the method, apparatus, and non-transitory computer-readable medium described above, receiving the indication of the targeted UE capability comprises: receiving the indication of the targeted UE capability in one or more of a user service description (USD), a single cell multipoint control channel (SC-MCCH), or a system information block (SIB).

Some examples of the method, apparatus, and non-transitory computer-readable medium described above may further include processes, features, means, or instructions for monitoring for a downlink control information (DCI) format based at least in part on the SC-MCCH.

In some examples of the method, apparatus, and non-transitory computer-readable medium described above, receiving the indication of the targeted UE capability comprises: receiving the indication of the targeted UE capability in a transmission formatted based at least in part on a minimum supported capability of the UE.

In some examples of the method, apparatus, and non-transitory computer-readable medium described above, the targeted UE capability comprises a maximum supported capability of the UE targeted by a service provider, or a minimum supported capability of the UE targeted by a service provider, or an actual supported capability of the UE targeted by the service provider, or a combination thereof.

Some examples of the method, apparatus, and non-transitory computer-readable medium described above may further include processes, features, means, or instructions for transmitting, by the UE, a request for content to a content provider, the request for content including a category of the UE, wherein the received indication of the targeted UE capability may be based at least in part on the category of the UE.

Some examples of the method, apparatus, and non-transitory computer-readable medium described above may further include processes, features, means, or instructions for transmitting, a report indicating successful receipt of the broadcast or multicast content.

Another method of wireless communication is described. The method may include determining a set of radio access parameters to be used to deliver broadcast or unicast content, transmitting the set of radio access parameters to a network node, receiving messages from at least one UE, the messages indicating successful reception of the broadcast or unicast content at the at least one UE, and modifying the set of radio access parameters based at least in part on the received messages.

Another apparatus for wireless communication is described. The apparatus may include means for determining a set of radio access parameters to be used to deliver broadcast or unicast content, means for transmitting the set of radio access parameters to a network node, means for receiving messages from at least one UE, the messages indicating successful reception of the broadcast or unicast content at the at least one UE, and means for modifying the set of radio access parameters based at least in part on the received messages.

Another apparatus for wireless communication is described. The apparatus may include a processor, memory in electronic communication with the processor, and instructions stored in the memory. The instructions may be operable to cause the processor to determine a set of radio access parameters to be used to deliver broadcast or unicast content, transmit the set of radio access parameters to a network node, receive messages from at least one UE, the messages indicating successful reception of the broadcast or unicast content at the at least one UE, and modify the set of radio access parameters based at least in part on the received messages.

Another non-transitory computer readable medium for wireless communication is described. The non-transitory computer-readable medium may include instructions operable to cause a processor to determine a set of radio access parameters to be used to deliver broadcast or unicast content, transmit the set of radio access parameters to a network node, receive messages from at least one UE, the messages indicating successful reception of the broadcast or unicast content at the at least one UE, and modify the set of radio access parameters based at least in part on the received messages.

In some examples of the method, apparatus, and non-transitory computer-readable medium described above, the set of radio access parameters comprises one or more of a coverage enhancement level, a UE category, a maximum bandwidth, or a maximum transport block size.

DETAILED DESCRIPTION

In Multimedia Broadcast Multicast Service (MBMS), broadcast or multicast content provided by a service provider may be transmitted from a broadcast multicast service center (BMSC) to a base station for distribution to one or more user equipments (UEs) using, for example, single-cell point-to-multipoint (SC-PTM) techniques. Broadcast or multicast distribution may allow for flexible scheduling and efficient utilization of resources while limiting the complexity of operations and hardware necessary to receive the data. This, in turn, may allow for efficient narrowband communications, such as narrowband-internet of things (NB-IoT) or enhanced machine type communication (MTC) (eMTC), within a network.

However, in MBMS, UEs (e.g., IoT or MTC devices) may have different capabilities (e.g., being able to support a different transport block (TB) sizes or different bandwidths). Each UE may belong to a category based on its capabilities. However, for example, when another UE is added to the field, the UE may have capabilities different than those of the UEs already connected. The service provider may accordingly inform the base station through the BMSC of a configuration supported by the UE. Thus, a method to efficiently optimize radio resources for communication with a UE that has not yet established a connection with a corresponding BMSC may be desirable.

In some examples, a service provider may explicitly indicate to a BMSC the category for a base station to use for a radio interface with a UE. Additionally or alternatively, the category may be implicitly determined by the base station from signaling received from the BMSC. In some cases, a range of service identifiers (e.g., temporary mobile group identities (TMGIs)) may be reserved for a category, and the BMSC may determine and transmit a corresponding service identifier to the base station based on the category to be used. A maximum UE capability may correspondingly be indicated in a user service description (USD) in a transmission, in a single cell multipoint control channel (SC-MCCH), or in a system information block (SIB).

In some examples, different UEs in a deployment of multiple UEs may prefer or use different levels of coverage enhancement. The service provider may correspondingly indicate to the BMSC an expected coverage enhancement for the services. Additionally or alternatively, the BMSC may set a target for a level of successful reception of transmissions, and adjust the level of coverage enhancement to reach the set target based on reports from a UE indicating whether the UE successfully received the transmissions.

Aspects of the disclosure are initially described in the context of a wireless communications system. Aspects of the disclosure are further illustrated by and described with reference to apparatus diagrams, system diagrams, and flowcharts that relate to capability and coverage determination for multimedia broadcast multicast services.

Figure 1:
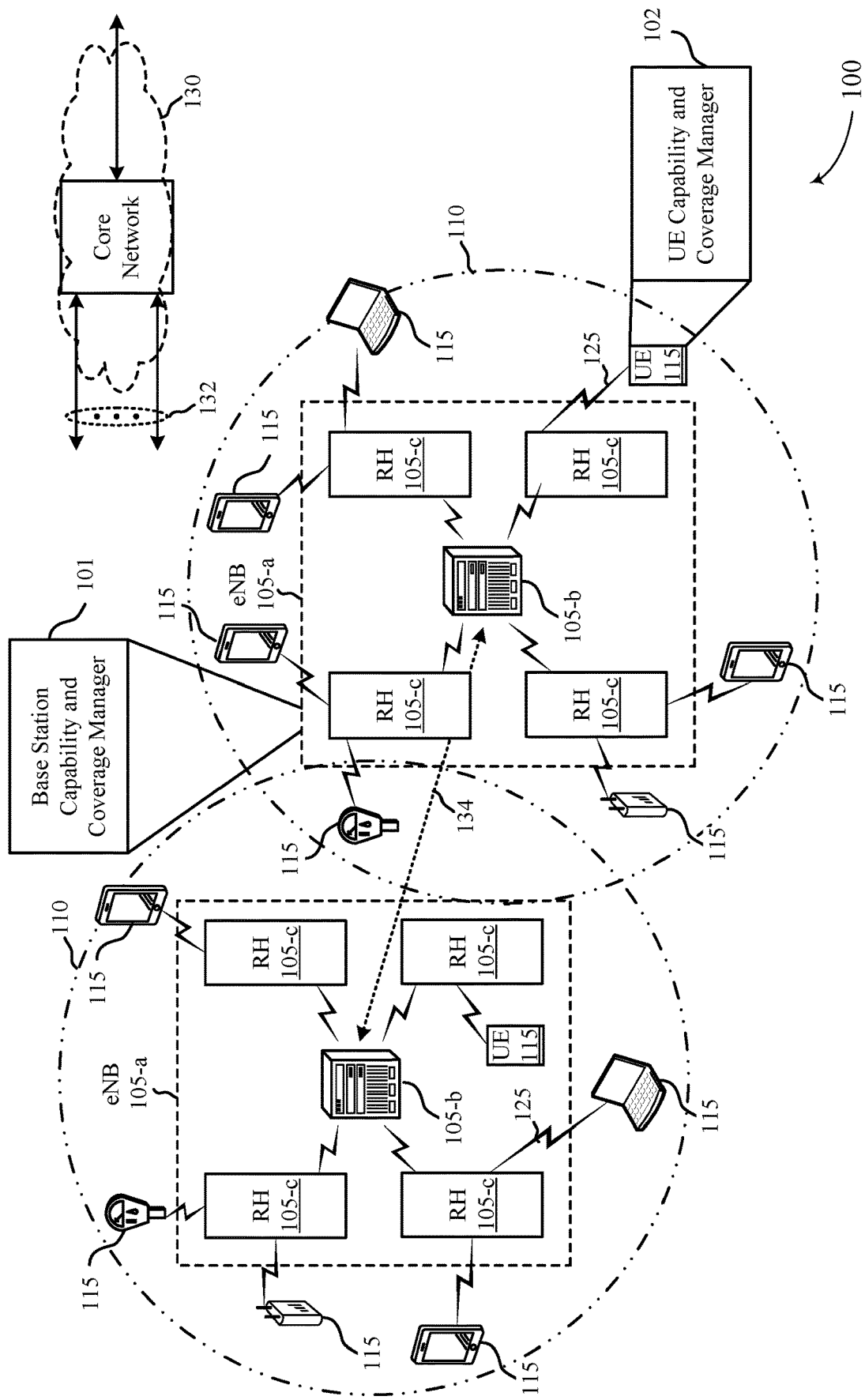
FIG. 1 illustrates an example of a wireless communications system that supports capability and coverage determination for multimedia broadcast multicast services in accordance with aspects of the present disclosure.

FIG. 1 illustrates an example of a wireless communications system 100 that supports capability and coverage determination for multimedia broadcast multicast services in accordance with aspects of the present disclosure. The wireless communications system 100 includes base stations 105, UEs 115, and a core network 130. In some examples, the wireless communications system 100 may be a Long Term Evolution (LTE) (or LTE-Advanced (LTE-A)) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support indication of UE categories to enable the efficient implementation of radio resources for UEs 115 which have not yet communicated with a BMSC.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a MTC device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one S-GW, and at least one P-GW. The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as base station 105-*a* may include subcomponents such as an access network entity 105-*b*, which may be an example of an access node controller (ANC) 105. Each access network entity 105-*b* may communicate with a number of UEs 115 through a number of other access network transmission entities 105-*c*, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

One or more of network devices 105 may include a base station capability and coverage manager 101, which may receive an indication of a targeted UE capability, where the targeted UE capability may be specified by a service provider for the delivery of broadcast or multicast content and associated with a radio interface between the network device 105 and a UE 115. In some cases, base station capability and coverage manager 101 may configure the radio interface based on the received indication of the targeted UE capability and transmit the broadcast or multicast content to the UE using the configured radio interface.

UEs 115 may include a UE capability and coverage manager 102, which may receive an indication of a targeted UE capability for the delivery of broadcast or multicast content and associated with a radio interface between the UE 115 and a base station 105. In some examples, UE capability and coverage manager 102 may identify a supported capability of the UE 115 and receive broadcast or multicast content using the radio interface based on an identified supported capability of the UE 115 and the targeted UE capability.

Wireless communications system 100 may be a packet-based network that operate according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and a network device, such as a base station 105 (or component of a base station 105), or core network 130 supporting radio bearers for user plane data. At the physical (PHY) layer, transport channels may be mapped to physical channels.

Wireless communications system 100 may include a RLC layer that connects higher layers (e.g., RRC and PDCP) to the lower layers (e.g., the MAC layer). The RLC layer may be located between the PDCP layer and the MAC layer in the user plane protocol stack. The RLC layer may perform segmentation and reassembly of upper layer packets in order to adapt them to the size which can actually be transmitted over the radio interface. For radio bearers which benefit from error-free transmission, the RLC layer also performs retransmission to recover from packet losses. Additionally, the RLC layer may perform reordering to compensate for out-of-order reception due to HARQ operation in the MAC layer. There may be one RLC entity defined per radio bearer.

In some wireless communications systems, a base station 105 may broadcast or multicast data to a UE 115. Wireless communications system 100 may include a BMSC, which may be a server defined for evolved MBMS (eMBMS) or MBMS, and configured to transmit multicast data files to the UE 115 through the base station 105 and an MBMS-GW. The MBMS-GW may be a network entity used for forwarding packets in the core network 130. That is, the MBMS-GW may forward packets to addresses set for different ANCs 105 by an MME (e.g., via an MCE).

Broadcast or multicast data may be transmitted on a control channel using, for example, single-cell point-to-multipoint (SC-PTM) or eMBMS techniques. These techniques may allow a network to flexibly schedule resources and provide broadcast or multicast services, and may also allow UEs 115 (e.g., IoT devices or MTC devices) to receive services of interest without undue complexity or overhead. For example, SC-PTM may be associated with a fewer number of resources used for communication in certain geographic areas (e.g., as compared to a multicast-broadcast single frequency network (MBSFN) transmissions), flexible resource allocation (e.g., due to dynamic scheduling), and may be multiplexed in the frequency domain with unicast transmissions for enhanced spectral efficiency. Additionally, with SC-PTM, a broadcast area may be dynamically adjusted to fit a geographic area for certain services (e.g., group calls) without a pre-establishment of MBMS bearers over a pre-defined geographic area.

Within wireless communications system 100, eMBMS or SC-PTM services may be associated with or identified by a TMGI. For example, a server within core network 130 may provide a TMGI to identify an eMBMS or SC-PTM session within wireless communications system 100. A TMGI may be a combination of a network or system identity, such as a public land mobile network (PLMN) and a service identity.

UEs 115 in wireless communication system may be associated with various UE categories that are representative of capabilities of a UE 115, where a UE category may define a combined uplink and downlink capability of the UE 115. For example, a UE capability may indicate a maximum transport block size (e.g., a number of bits supported) and/or bandwidth supported by the UE 115. In some cases, the UE 115 may communicate its capability to the network through RRC or non-access stratus (NAS) signaling to ensure that downlink transmissions are supported by the UE 115. For example, the UE 115 may transmit a UE capability information message to the core network 130 when the UE 115 initially registers with the core network 130. Downlink transmissions to the UE 115 by an ANC 105 may be based on respective UE categories for different UEs 115.

Wireless communications system 100 may support determining UE 115 capabilities, such as a category or a coverage level for broadcast or multicast content (e.g., content provided using MBMS). Generally, the described techniques provide for configuring a radio interface to account for an indicated capability of a target UE 115. For example, a base station may receive an indication of a capability of a particular targeted UE 115. The capability of the targeted UE 115 may be specified by a service provider to deliver MBMS content, and subsequently associated with a radio interface between the base station and the target UE 115. The radio interface may then be configured based on the indicated capability of the target UE 115, for example, by configuring a transport block size or bandwidth. The base station may then transmit broadcast or multicast content to the UE 115 using the configured radio interface.

Figure 2:
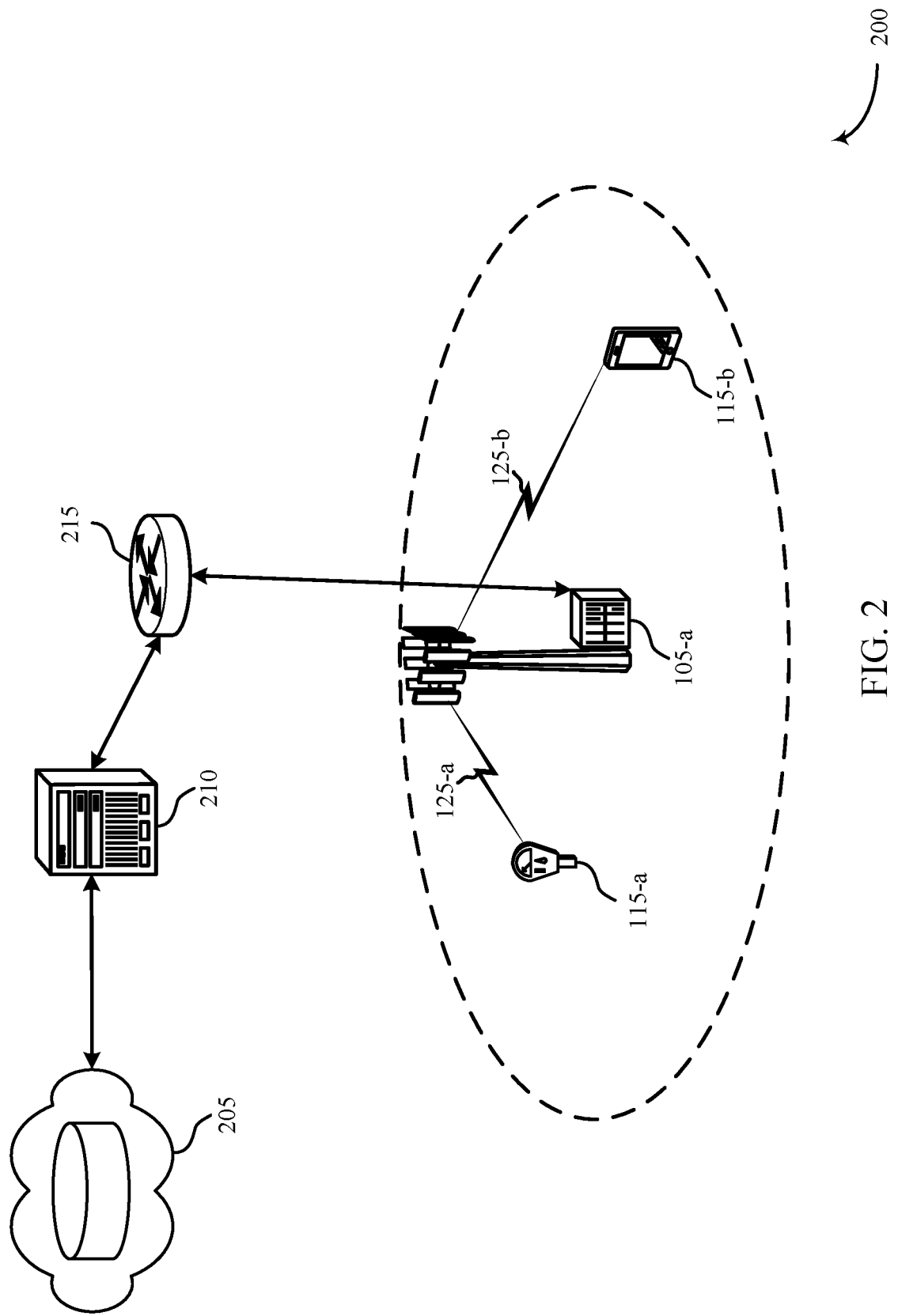
FIG. 2 illustrates an example of a wireless communications system that supports capability and coverage determination for multimedia broadcast multicast services in accordance with aspects of the present disclosure.

FIG. 2 illustrates an example of a wireless communications system 200 that supports capability and coverage determination for multimedia broadcast multicast services in accordance with aspects of the present disclosure. Wireless communications system 200 may include base station 105-*a* and ones or more UEs 115 which may be examples of the corresponding devices as described with reference to FIG. 1. UE 115-*a* and UE 115-*b* may be examples of different types of NB-IoT devices, or different types of eMTC devices. UE 115-*a* and UE 115-*b* may receive data from base station 105-*a* via communication links 125-*a* and 125-*b*, respectively. Wireless communications system 200 may further include a service provider 205 (i.e., a content provider), a BMSC 210, and a MBMS gateway (MBMS-GW) 215, or a combination thereof. In some examples, wireless communications system 200 may support broadcasting or multicasting data.

Service provider 205 may communicate with BMSC 210 to negotiate quality of service (QoS) requirements, for example, to broadcast multimedia content (e.g., a video stream). The QoS requirements may include metrics such as a delay, an error rate, and a maximum bit rate that may be supported. BMSC 210 may then set up a MBMS service (e.g., a MBMS bearer service) with base station 105-*a* through MBMS-GW 215. BMSC 210 may send to base station 105-*a* the negotiated QoS requirements through MBMS-GW 215, and, based on the received QoS requirements, base station 105-*a* may then apply a radio configuration to a radio interface with the one or more UEs 115. The radio configuration may include, for example, a modulation and coding scheme (MCS) including a modulation order and a code rate which may describe the information data rate for transmission. If, for example, a higher data rate is preferred, a relatively higher MCS scheme may be used. However, if a higher reliability is preferred, a relatively lower MCS scheme may be used.

In MBMS, different UEs 115 (e.g., IoT or MTC devices) may have different capabilities, for example, being able to support a larger TB size or a larger bandwidth (e.g., as compared to the TB size of bandwidth that other UEs 115 are capable of supporting). A UE 115 may belong to a particular category, where the category may include other UEs 115 having similar capabilities. For example, where the UE 115 is an NB-IoT device, the NB-IoT device may belong to a category of categories defining a maximum TB size (e.g., a first category N1 may define a maximum TB size of 680 bits, a second category N2 may define a maximum TB size of 2,536 bits, and a third category may define a maximum TB size of 1,352 bits). In another example, where the UE 115 is an eMTC device, the MTC device may belong to a category that may define a bandwidth and a maximum TB size (e.g., a first category M1 may define a bandwidth of 1.4 MHz and a maximum TB size of 1,000 bits, a second category M2 may define a bandwidth of 5 MHz and a maximum TB size of 4,008 bits, and a third category M32 may define a bandwidth of 20 MHz and a maximum TB size of 31,704 bits). BMSC 210 may establish a SC-PTM configuration with a UE 115 when the UE 115 is in a connected mode (i.e., when the UE 115 may send and receive data) according to the category in which the capabilities of the UE 115 are supported.

However, when another UE 115 is added to the field, the UE 115 may have a functionality different than that of the already-connected UEs 115. In this scenario, service provider 205 may inform base station 105-*a*, via BMSC 210 and MBMS-GW 215, of a configuration including a category supporting the capabilities of the new UE 115. Thus, a method to efficiently optimize radio resources for a UE 115 that has not yet established a connection with a corresponding BMSC 210 may be desirable.

To indicate the category corresponding to the capabilities of a UE 115, service provider 205 may first determine a respective category for the UE 115. Service provider 205 may know a type of UE 115 to which the services of service provider 205 are targeted (e.g., to UEs 115-*a* for a metering service, to UEs 115-*b* that are smartwatches, etc.), in which case service provider 205 may determine the category of the UE 115 accordingly. Additionally or alternatively, service provider 205 may determine the category of the UE 115 based on over-the-top signaling from the UE 115. That is, the UE 115 may signal directly to service provider 205 the category corresponding to the capabilities of the UE 115. After determining the category corresponding to the capabilities of the UE 115, service provider 205 may transmit information including the category to base station 105-*a* through BMSC 210 and MBMS-GW 215. Based on the information received from service provider 205 through BMSC 210 and MBMS-GW 215, base station 105-*a* may determine parameters for communication with the UE 115 corresponding the capabilities of the UE 115 including, for example, a bandwidth and a maximum TB size.

In a first technique to establish a category to be used for a UE 115, service provider 205 may explicitly indicate to BMSC 210 the category for BMSC 210 to use for a radio interface with the UE 115. When starting MBMS, the category may be indicated in a field in an interface between service provider 205 and BMSC 210. The indicated category may indicate a maximum category to be used. That is, while the indicated category may indicate a category that supports a relatively greater maximum TB size, a category that supports a relatively smaller maximum TB size may still be used. For example, if a category M2 (defining, e.g., a maximum TB size of 4008 bits) is indicated, a category M1 (defining, e.g., a maximum TB size of 1000 bits) may be used. The category may be included in the QoS requirements, as may have been negotiated between service provider 205 and BMSC 210. The indicated category may, however, be overridden by BMSC 210, or BMSC 210 may reject the QoS requirements, if BMSC 210 determines that another category may be more suitable. Alternatively, the interface between service provider 205 and BMSC 210 may not provide a category to be used. In this case, BMSC 210 may, on its own, determine a category to be used for a radio interface between the BMSC 210 and the UE 115.

Alternatively, in a second technique to establish a category to be used for a UE 115, the category may be implicitly determined from signaling from BMSC 210 to base station 105-*a*. In this case, a range of service identifiers (e.g., TMGIs) may be reserved for a particular category, and BMSC 210 may determine a corresponding service identifier based on the category to be used. BMSC 210 may then transmit the determined service identifier to base station 105-*a* via MBMS-GW 215. Upon receiving the service identifier from BMSC 210, base station 105-*a* may then determine parameters for communication with UE 115 corresponding to the capabilities of the UE 115 including, for example, a maximum bandwidth and a maximum TB size. Alternatively, rather than determining the parameters for communication with the UE 115 based on a service identifier, there may be a mapping between the negotiated QoS (e.g., using a QoS class identifier (QCI)) and the maximum bandwidth and TB size corresponding to the capabilities of the UE 115. The QoS (e.g., a QCI) may thus be determined for a UE or a category of UEs capable of using a certain bandwidth, or maximum bandwidth. In other examples, a certain QoS (e.g., a QCI) may be associated with a UE or a category of UEs using a certain TB size, or maximum TB size. In still other examples, the QoS (or QCI) may be associated with a UE or group of UEs with capabilities associated with a certain combination of bandwidths and TB size (or maximum values of these). Thus, in some examples, the BMSC may define the QCI such that the QCI is an operator defined QCI, for example, a non-standardized value that may be pre-arranged between the operator and service provider 205.

Capabilities of a UE 115 may be indicated in a USD in a transmission, in a SC-MCCH, or in a SIB. That is, the USD may contain an indication of a maximum capability, or an actual capability, of the UE 115, as may be received via MBMS or another broadcast channel. For example, a service identifier (e.g., a TMGI) included in a transmission from a BMSC 210 to the UE 115 may include a field for a category that indicates a maximum capability for UEs 115 of the category. Then, if the UE 115 supports the category indicated in the received transmission, the UE 115 may successfully receive the transmission. Alternatively, the USD may be transmitted using a default or pre-configured service identifier (e.g., a TMGI) indicating a reference category corresponding to a minimum capability of the UE 115 (e.g., for a NB-IoT device, a TMGI X, or, for an eMTC device, a TMGI Y, where each of the TMGI X and TMGI Y may correspond to a relatively small minimum TB size). Additionally or alternatively, a maximum capability, or a reference capability, of a UE 115 may be transmitted in radio access network (RAN) signaling, such as in a SC-MCCH or a SIB. The received maximum capability or reference capability may then be used to determine a downlink control information (DCI) format.

In some cases, different UEs 115 in a deployment of multiple UEs 115 may use different levels of coverage enhancement. For example, a software update for a UE 115 that may be subject to higher path loss (e.g., UE 115-*a* for a metering service in a basement) may use a relatively larger coverage enhancement, whereas a software update for a UE 115 that may be subject to less path loss (e.g., for audio streaming services to UE 115-*b* that is a smartwatch) may use a relatively small coverage enhancement. Service provider 205 may accordingly indicate to BMSC 210 an expected coverage enhancement for the services in, for example, the QoS requirements. For example, based on a known type of typical target UE 115, service provider 205 may transmit a signal with a level of coverage enhancement selected from the set $\{c_0, c_1, c_2, c_3\}$, where $c_0$ may represent no coverage enhancement, $c_1$ may represent a small coverage enhancement, $c_2$ may represent a medium coverage enhancement, and $c_3$ may represent a large coverage enhancement, each representing, for example, a dB value.

Additionally or alternatively, BMSC 210 may set a target for a level of successful reception and adjust the level of coverage enhancement to reach the set target based on received responses from UEs 115. For example, BMSC 210 may set a target of 99% reception of service. After announcing the service, each UE 115 in communication with BMSC 210 may report to BMSC 210 whether the UE 115 received the service. If BMSC 210 determines that the target level of successful reception was not met, BMSC 210 may then increase its coverage enhancement level to attempt to reach its target level of successful reception. Service provider 205 may similarly apply this technique to adjust the level of coverage enhancement in the QoS requirements based on BMSC 210 reporting a level of successful reception to service provider 205. For example, if BMSC 210 determines that the target level of successful reception was not met, BMSC 210 may relay this information to service provider 205, and service provider 205 may then increase the level of coverage enhancement in the QoS requirements (e.g., from $c_1$ to $c_2$).

Figure 3:
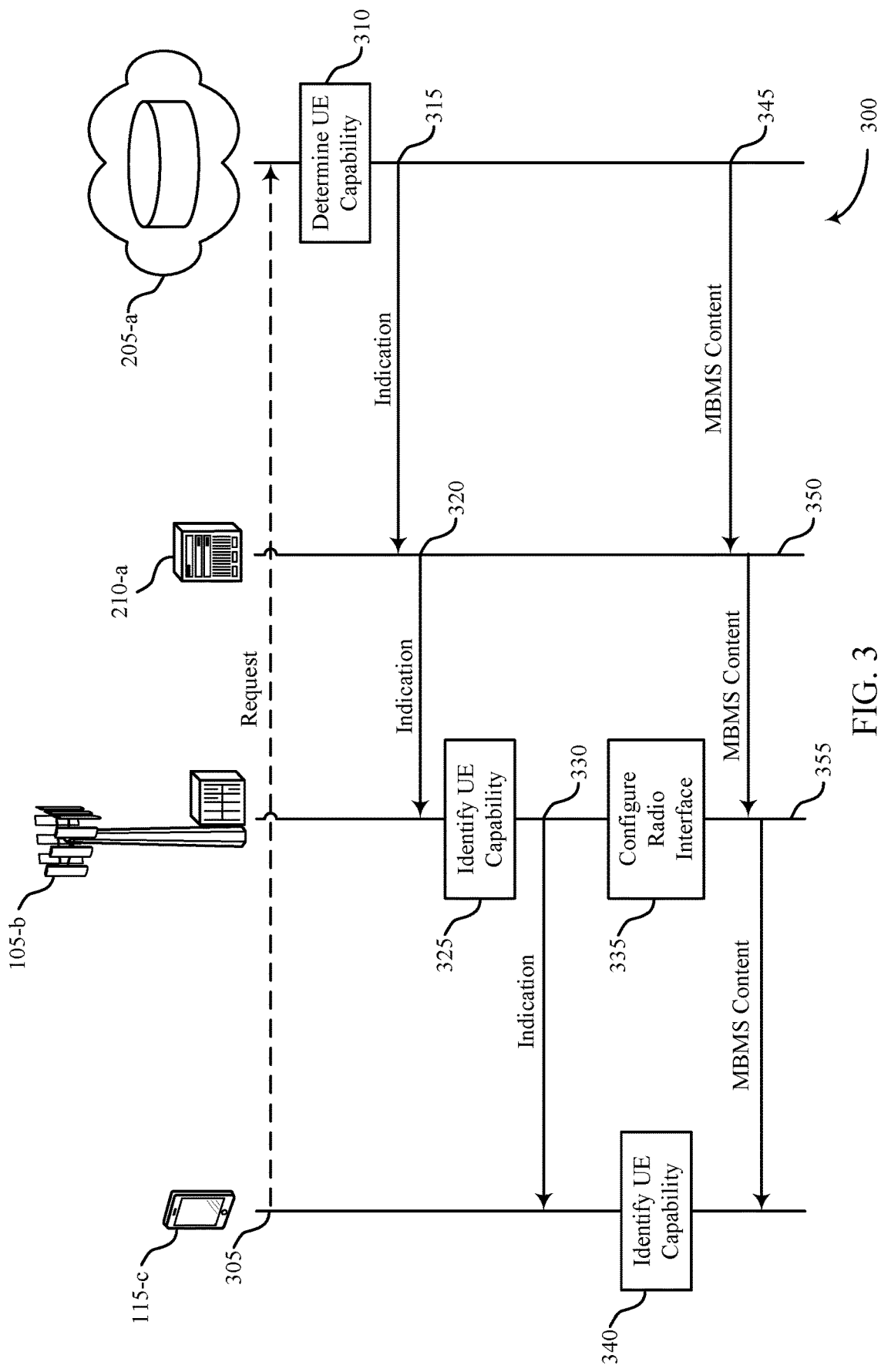
FIGS. 3 and 4 illustrate examples of process flows in wireless communications systems that support capability and coverage determination for multimedia broadcast multicast services in accordance with aspects of the present disclosure.

FIG. 3 illustrates an example of a process flow 300 in a wireless communications system that supports capability and coverage determination for multimedia broadcast multicast services in accordance with aspects of the present disclosure. Process flow 300 includes UE 115-*c* and base station 105-*b*, which may be respective examples of a UE 115 and a base station 105 as described with reference to FIGS. 1 and 2. Process flow 300 further includes service provider 205-*a* and BMSC 210-*a*, which may be respective examples of a service provider 205 and a BMSC 210 as described with reference to FIG. 2. Process flow 300 may be an example of identifying and transmitting an indication of a UE capability and accordingly transmitting MBMS content based on the UE capability.

At 305, UE 115-*c* may optionally transmit to service provider 205-*a*, and service provider 205-*a* may receive from UE 115-*c*, a request for MBMS content. UE 115-*c* may further indicate in the request for MBMS content a category corresponding to the capabilities of UE 115-*c*, where the category may define parameters (e.g., a bandwidth and maximum TB size) for UEs 115 having similar capabilities to UE 115-*c*. The request for content may be transmitted via over-the-top signaling from UE 115-*c* to service provider 205-*a*. That is, UE 115-*c* may signal directly to service provider 205-*a* the category corresponding to the capabilities of UE 115-*c*.

At 310, service provider 205-*a* may determine a targeted UE capability for UE 115-*c*. Service provider 205-*a* may determine the capability based on a category to which UE 115-*c* belongs. To determine the capability, or category defining a corresponding capability, service provider 205-*a* may already know a type of UE 115 to which the services of service provider 205-*a* are targeted (e.g., to UEs 115 for a metering service, to UEs 115 that are smartwatches, etc.) and to which UE 115-*c* belongs. In this case, service provider 205-*a* may determine the category of UE 115-*c* accordingly. Additionally or alternatively, service provider 205-*c* may determine the category of UE 115-*c* based on over-the-top signaling from UE 115-*c*, for example, the request for MBMS content (e.g., via the request sent at 305).

At 315, service provider 205-*a* may transmit to BMSC 210-*a*, and BMSC 210-*a* may receive from service provider 205-*a*, an indication of the targeted UE capability. The indication of the capability for UE 115-*c* may be included in a USD, SC-MCCH, or SIB within the transmission.

At 320, BMSC 210-a may transmit to base station 105-b, and base station 105-b may receive from BMSC 210-a, an indication of the capability for targeted UE 115-c. Additionally alternatively, the indication of the capability may be transmitted and received through a network node, where the network node may be, for example a MBMS-GW, or BMSC 210-a as described above. In some cases, the capability may have been specified by service provider 205-a for the delivery of MBMS content. The indication may further include a category corresponding to UE 115-c. In some examples, the category may correspond to a set of UEs 115 having similar capabilities. For example, UE 115-c may be an example of an NB-IoT device, and the NB-IoT device may belong to a category that defines a maximum TB size. Alternatively, where UE 115-c is an eMTC device, the MTC device may belong to a category that may define a bandwidth and a maximum TB size. Alternatively, the indication of the capability may include one or more TMGIs (i.e., service identifiers), where the TMGIs may implicitly indicate to the category to which UE 115-c belongs.

At 325, base station 105-b may identify a capability for the targeted UE 115-c. In one case, the capability may be identified based on an explicit indication received from service provider 205-a through BMSC 210-c and a MBMS-GW. For example, the capability of UE 115-c may be identified based on an indicated category to which UE 115-c belongs. Alternatively, the category may be implicitly determined from the signaling from a network node (e.g., BMSC 210, or a MBMS-GW) to base station 105-b. In this case, a range of TMGIs (i.e., service identifiers) may be reserved for a particular category, and BMSC 210-a may have determined a corresponding service identifier based on the category corresponding to UE 115-c. Upon receiving the service identifier, base station 105-b may then identify the parameters for communication with UE 115-c corresponding the capabilities of the UE 115-c. As another alternative, rather than determining the parameters for communication with the UE 115 based on a service identifier, there may be a mapping between the negotiated QoS (e.g., using a QCI) and the maximum bandwidth and TB size corresponding to the capabilities of UE 115-c. Base station 105-b may use the identified capability to accordingly configure a radio interface between base station 105-b and UE 115-c.

At 330, base station 105-b may transmit to UE 115-c, and UE 115-c may receive from base station 105-b, an indication of a targeted UE capability (e.g., a capability of UE 115-c). The targeted UE capability may have been specified by service provider 205-a for the delivery of MBMS content. The capability may be then be associated with and used to configure a radio interface between UE 115-c and base station 105-b. In some cases, the indication may be based on a minimum supported capability of UE 115-c. In other cases, the indication may be based on a maximum supported capability of a targeted UE (e.g., UE 115-c), or an actual supported capability of the targeted UE. The indication may include a category corresponding to UE 115-c, where the category may correspond to a set of UEs 115 having similar capabilities. The category may define parameters including, for example, a bandwidth and a maximum TB size. The capability, or corresponding category, may be indicated in a USD, SC-MCCH, or SIB within the transmission. Based on receiving, for example, the USD, UE 115-c may then monitor for MBMS content (e.g., broadcast or multicast content), as UE 115-c may receive, illustratively, at 355. The capability may further be used to determine a DCI format. In this case, UE 115-c may accordingly monitor for a DCI format based on the SC-MCCH.

At 335, base station 105-b may configure a radio interface based on the indicated capability of the targeted UE 115-c received from service provider 205-a through BMSC 210-a and a MBMS-GW. At 340, UE 115-c may identify a supported capability of UE 115-c based on the indication of the capability of UE 115-c received at 330. The capability may be included in a category, where the category may define a bandwidth and a maximum TB size supported by UEs of the category to which UE 115-c corresponds. UE 115-c may further determine whether the supported capability is compatible with the capabilities of UE 115-c. If the supported capability is compatible with the capabilities of UE 115-c, UE 115-c may then monitor for MBMS content (e.g., broadcast or multicast content), as UE 115-c may receive, illustratively, at 355.

At 345, service provider 205-a may transmit to BMSC 210-a, and BMSC 210-a may receive from service provider 205-a, broadcast or multicast content (such as MBMS content). At 350, BMSC 210-a may transmit to base station 105-b, and base station 105-b may receive from BMSC 210-a, MBMS content. Additionally alternatively, the MBMS content may be transmitted and received through a network node, where the network node may be, for example a MBMS-GW, or BMSC 210-a as stated. At 355, base station 105-b may transmit to UE 115-c, and UE 115-c may receive from base station 105-b, MBMS content using the radio interface previously configured based on the identified supported capability of UE 115-c.

Figure 4:
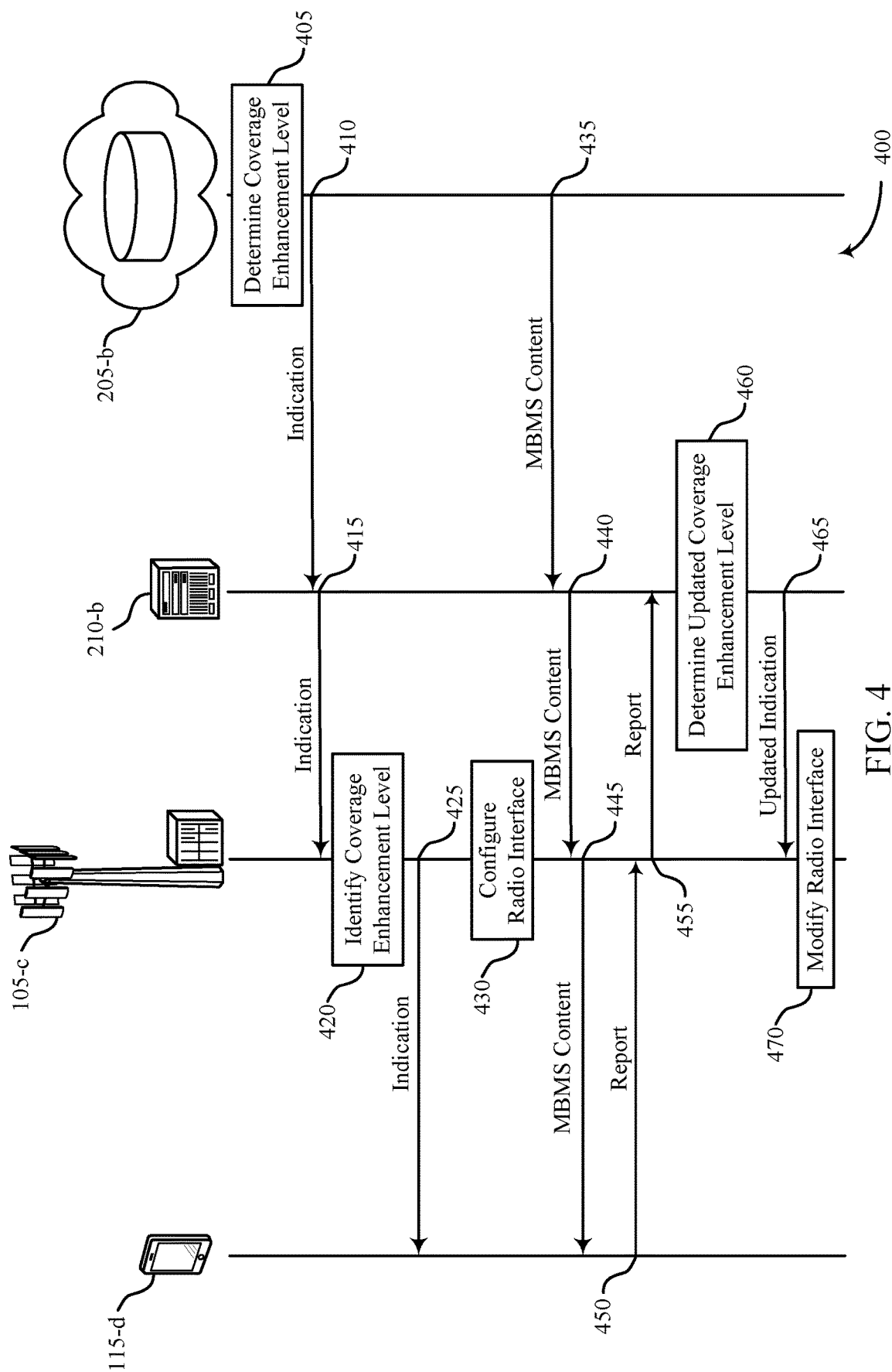

FIG. 4 illustrates an example of a process flow 400 in a wireless communications system that supports capability and coverage determination for multimedia broadcast multicast services in accordance with aspects of the present disclosure. Process flow 400 includes UE 115-d and base station 105-c, which may be respective examples of a UE 115 and a base station 105 as described with reference to FIGS. 1 and 2. Process flow 400 further includes service provider 205-b and BMSC 210-b, which may be respective examples of a service provider 205 and a BMSC 210 as described with reference to FIG. 2. Process flow 400 may be an example of identifying and adjusting a coverage enhancement level for a UE.

At 405, service provider 205-b may determine a coverage enhancement level (i.e., an expected coverage level) expected to provide the desired coverage enhancement to one or more connected UEs, including, for example, UE 115-d.

At 410, service provider 205-b may transmit to BMSC 210-b, and BMSC 210-b may receive from service provider 205-b, an indication specifying the coverage enhancement level determined at 405. Different UEs 115 in a deployment of multiple UEs 115 may use different levels of coverage enhancement. For example, a software update for a UE 115 that may be subject to higher path loss (e.g., a UE 115 for a metering service in a basement) may use a relatively larger coverage enhancement, whereas a software update for a UE 115 that may be subject to less path loss (e.g., for audio streaming services to a UE 115 that is a smartwatch) may use a relatively small coverage enhancement. Service provider 205-b may accordingly indicate to BMSC 210 an expected coverage enhancement for the services in, for example, the QoS requirements. Based on a known type of typical target UE 115 (e.g., UE 115-d), service provider 205-b may transmit a signal with a level of coverage enhancement selected from the set $\{c_0, c_1, c_2, c_3\}$, where $c_0$ may represent no coverage enhancement, $c_1$ may represent a small coverage enhancement, $c_2$ may represent a medium coverage enhancement, and $c_3$ may represent a large coverage enhancement, each representing, for example, a dB value.

At 415, BMSC 210-*b* may transmit to base station 105-*c*, and base station 105-*c* may receive from BMSC 210-*b*, an indication specifying the determined coverage enhancement level. Additionally alternatively, the indication specifying the determined coverage enhancement level may be transmitted and received through a network node, where the network node may be, for example a MBMS-GW, or BMSC 210-*b* as stated.

At 420, base station 105-*c* may identify a coverage enhancement level. The identified coverage enhancement level may be identified based on the coverage enhancement level determined by service provider 205-*b* at 405. At 425, base station 105-*c* may transmit to UE 115-*d*, and UE 115-*d* may receive from base station 105-*c*, an indication of a targeted UE capability including the determined coverage enhancement level.

At 430, base station 105-*c* may configure a radio interface based on the received indication of the expected coverage level. An indication of the capability of UE 115-*d* may include the indication of the expected coverage level. At 435, service provider 205-*b* may transmit to BMSC 210-*b*, and BMSC 210-*b* may receive from service provider 205-*b*, broadcast or multicast content (such as MBMS content).

At 440, BMSC 210-*b* may transmit to base station 105-*c*, and base station 105-*c* may receive from BMSC 210-*b*, MBMS content. Additionally alternatively, the MBMS content may be transmitted and received through a network node, where the network node may be, for example a MBMS-GW, or BMSC 210-*b* as stated.

At 445, base station 105-*c* may transmit to UE 115-*d*, and UE 115-*d* may receive from base station 105-*c*, MBMS content using the radio interface previously configured based on the identified coverage enhancement level. At 450, UE 115-*d* may transmit to base station 105-*c*, and base station 105-*c* may receive from UE 115-*d*, a report indicating whether UE 115-*d* successfully received the transmitted MBMS content. Base station 105-*c* may receive a plurality of such reports from multiple UEs.

At 455, base station 105-*c* may transmit to BMSC 210-*b*, and BMSC 210-*b* may receive from base station 105-*c*, a report indicating whether UE 115-*d* successfully received the transmitted MBMS content. Additionally alternatively, the report indicating whether the UEs successfully received the transmitted MBMS content may be transmitted and received through a network node, where the network node may be, for example a MBMS-GW, or BMSC 210-*b* as stated. BMSC 210-*b* may receive one or more of such reports from multiple UEs, from which BMSC 210-*b* may determine a proportion of the total amount of UEs that successfully received the transmitted MBMS content.

At 460, BMSC 210-*b* may determine an updated coverage enhancement level based on the received one or more reports indicating whether UEs 115 (including, e.g., UE 115-*d*) successfully received the transmitted MBMS content. In some cases, BMSC 210-*b* may have set a target for a level of successful reception and adjust the level of coverage enhancement to reach the set target based on received responses from UEs 115. For example, BMSC 210-*b* may set a target of 99% reception of service. After announcing the service, each UE 115 in communication with BMSC 210-*b* may report to BMSC 210-*b* whether the UE 115 received the service. Based on the reports, BMSC 210-*b* may determine an updated coverage enhancement level to enable the respective UEs 115 to successfully receive the MBMS content at the desired rate. If BMSC 210 determines that the target level of successful reception was not met, BMSC 210 may then increase its coverage enhancement level to attempt to reach its target level of successful reception.

While 460 discusses determining an updated coverage level, additionally or alternatively, BMSC 210 may modify other radio access parameters based on the received one or more reports indicating whether UEs 115 (including, e.g., UE 115-*d*) successfully received the transmitted MBMS content. BMSC 210-*b* may accordingly determine other parameters based on the capabilities of the responding UEs 115. For example, in addition modifying the coverage enhancement level, BMSC 210 may modify a category for a UE 115, a maximum bandwidth, or a maximum TB size.

At 465, BMSC 210-*b* may transmit to base station 105-*c*, and base station 105-*c* may receive from BMSC 210-*b*, an updated indication specifying the updated coverage enhancement level determined at 460. Additionally or alternatively, the updated indication specifying the updated coverage enhancement level may be transmitted and received through a network node, where the network node may be, for example a MBMS-GW, or BMSC 210-*b* as stated. Further, as discussed with reference to 460, BMSC 210-*b* may further transmit an updated indication of parameters including, for example, a category for a UE 115, a maximum bandwidth, or a maximum TB size.

At 470, base station 105-*c* may modify the radio interface based on the received updated indication of the updated coverage enhancement level. Base station 105-*c* may further modify the radio interface based on updated parameters received in the updated indication at 465, including, for example, a category for a UE 115, a maximum bandwidth, or a maximum TB size. Base station 105-*c* may then use the modified radio interface to transmit MBMS data to one or more UEs, including, for example, UE 115-*d*. This process may be iterated, thus providing for repeated adjustments of the coverage enhancement level, until the desired ratio of connected UEs have successfully received the MBMS data.

Figure 5:
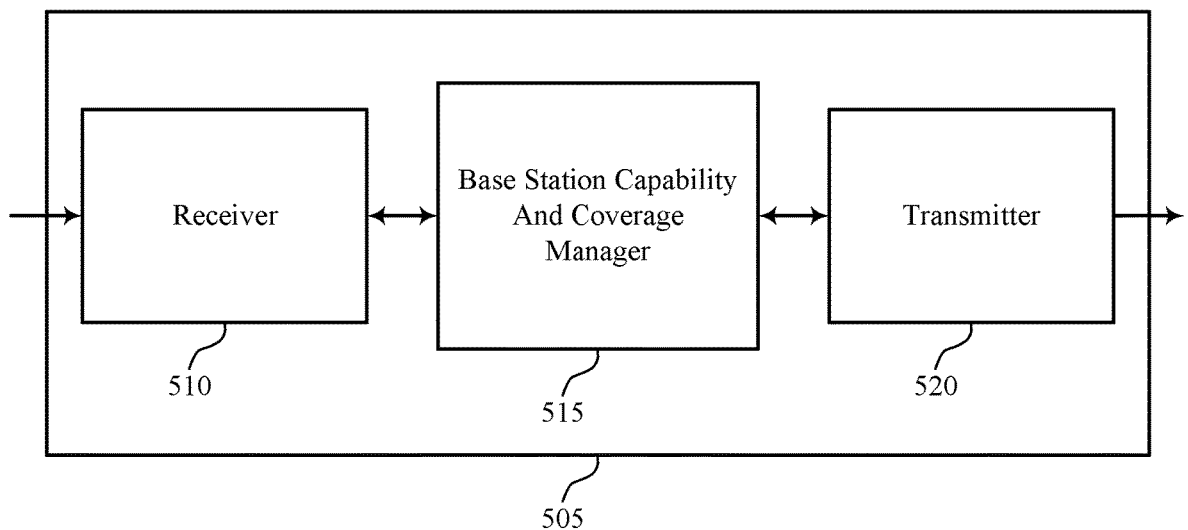
FIGS. 5 and 6 show block diagrams of a wireless device that supports capability and coverage determination for multimedia broadcast multicast services in accordance with aspects of the present disclosure.

FIG. 5 shows a block diagram 500 of a wireless device 505 that supports capability and coverage determination for multimedia broadcast multicast services in accordance with aspects of the present disclosure. Wireless device 505 may be an example of aspects of a base station 105 as described with reference to FIG. 1. wireless device 505 may include receiver 510, base station capability and coverage manager 515, and transmitter 520. wireless device 505 may also include a processor. Each of these components may be in communication with one another (e.g., via one or more buses).

Receiver 510 may receive information such as packets, user data, or control information associated with various information channels (e.g., control channels, data channels, and information related to capability and coverage determination for multimedia broadcast multicast services, etc.). Information may be passed on to other components of the device. The receiver 510 may be an example of aspects of the transceiver 835 as described with reference to FIG. 8.

Base station capability and coverage manager 515 may be an example of aspects of the base station capability and coverage manager 815 as described with reference to FIG. 8. Base station capability and coverage manager 515 and/or at least some of its various sub-components may be implemented in hardware, software executed by a processor, firmware, or any combination thereof. If implemented in software executed by a processor, the functions of the base station capability and coverage manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The base station capability and coverage manager 515 and/or at least some of its various sub-components may be physically located at various positions, including being distributed such that portions of functions are implemented at different physical locations by one or more physical devices. In some examples, base station capability and coverage manager 515 and/or at least some of its various sub-components may be a separate and distinct component in accordance with various aspects of the present disclosure. In other examples, base station capability and coverage manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station capability and coverage manager 515 may receive an indication of a targeted UE capability, the targeted UE capability specified by a service provider for the delivery of broadcast or multicast content and associated with a radio interface between the base station 105 and a UE 115, configure the radio interface based on the received indication of the targeted UE capability, and transmit the broadcast or multicast content to the UE 115 using the configured radio interface. In some cases, the indication of the targeted UE capability may include a QCI. In some cases, base station capability and coverage manager 515 may identify a mapping between the QCI and a maximum bandwidth, or a maximum transport block size, or a combination thereof, and configure the radio interface based on the identified mapping. Base station capability and coverage manager 515 may also determine a set of radio access parameters to be used to deliver broadcast or unicast content, transmit the set of radio access parameters to a network node, receive messages from at least one UE 115, the messages indicating successful reception of the broadcast or unicast content at the at least one UE 115, and modify the set of radio access parameters based on the received messages.

Transmitter 520 may transmit signals generated by other components of the device. In some examples, the transmitter 520 may be collocated with a receiver 510 in a transceiver module. For example, the transmitter 520 may be an example of aspects of the transceiver 835 as described with reference to FIG. 8. The transmitter 520 may include a single antenna, or it may include a set of antennas.

Figure 6:
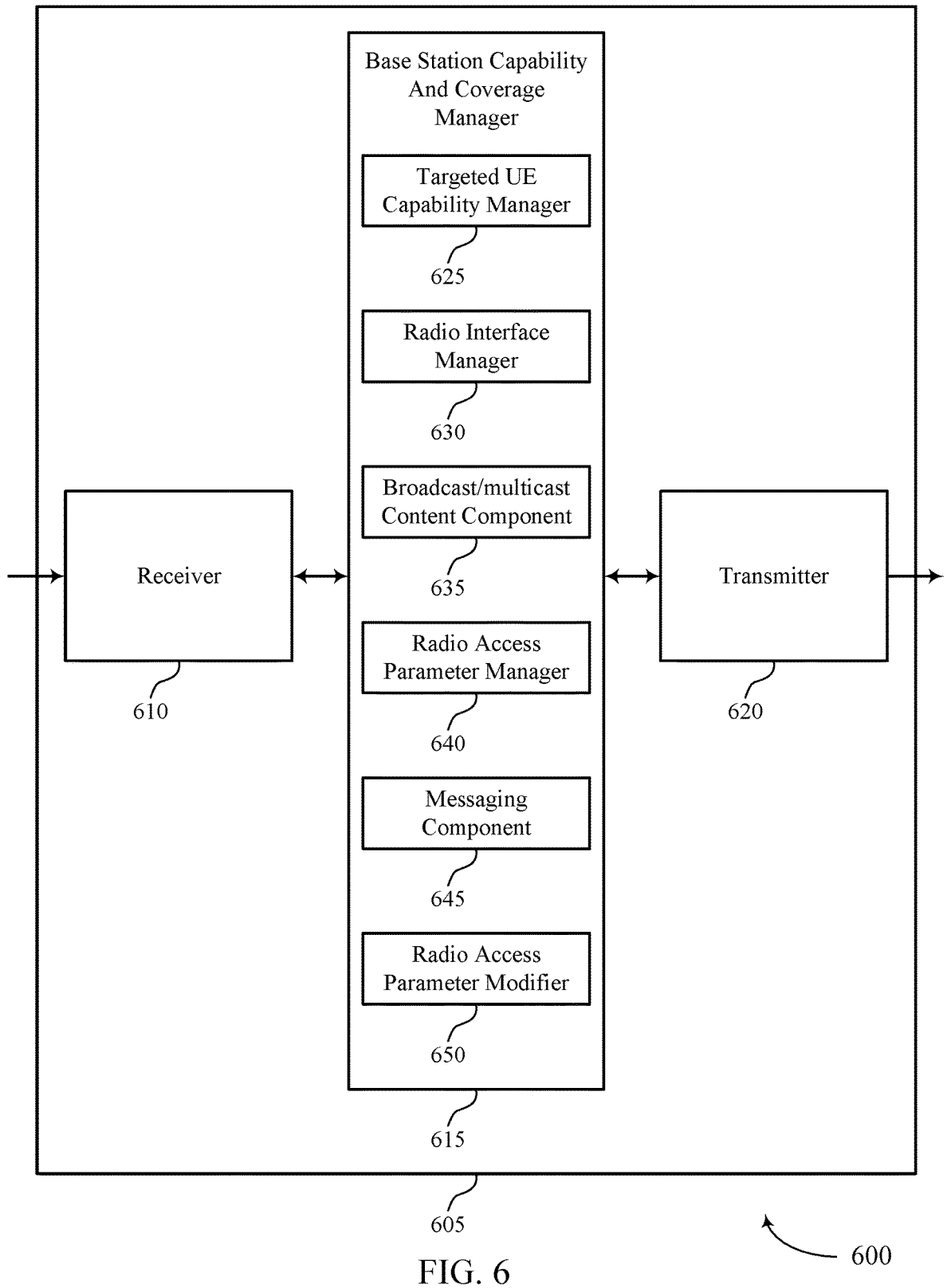

FIG. 6 shows a block diagram 600 of a wireless device 605 that supports capability and coverage determination for multimedia broadcast multicast services in accordance with aspects of the present disclosure. Wireless device 605 may be an example of aspects of a wireless device 505 or a base station 105 as described with reference to FIGS. 1 and 5. wireless device 605 may include receiver 610, base station capability and coverage manager 615, and transmitter 620. wireless device 605 may also include a processor. Each of these components may be in communication with one another (e.g., via one or more buses).

Receiver 610 may receive information such as packets, user data, or control information associated with various information channels (e.g., control channels, data channels, and information related to capability and coverage determination for multimedia broadcast multicast services, etc.). Information may be passed on to other components of the device. The receiver 610 may be an example of aspects of the transceiver 835 as described with reference to FIG. 8.

Base station capability and coverage manager 615 may be an example of aspects of the base station capability and coverage manager 815 as described with reference to FIG. 8. Base station capability and coverage manager 615 may also include targeted UE capability manager 625, radio interface manager 630, broadcast/multicast content component 635, radio access parameter manager 640, messaging component 645, and radio access parameter modifier 650.

Targeted UE capability manager 625 may receive an indication of a targeted UE capability, the targeted UE capability specified by a service provider for the delivery of broadcast or multicast content and associated with a radio interface between the base station 105 and a UE 115 and receive an updated indication of a targeted UE capability from the network node, the radio interface modified based on the updated targeted UE capability. In some cases, the indication of the targeted UE capability may include a QCI. In some cases, the indication of the targeted UE capability may be received from a service provider.

Radio interface manager 630 may configure the radio interface based on the received indication of the targeted UE capability and configure the radio interface based on the received indication of the expected coverage level, the received indication of the targeted UE capability including the indication of the expected coverage level. In some cases, configuring the radio interface based on the received indication of the targeted UE capability includes: determining a maximum bandwidth, or a maximum transport block size, or a combination thereof to be used to transmit the broadcast or multicast content.

Broadcast/multicast content component 635 may transmit the broadcast or multicast content to the UE 115 using the configured radio interface. Radio access parameter manager 640 may determine a set of radio access parameters to be used to deliver broadcast or unicast content and transmit the set of radio access parameters to a network node. In some cases, the set of radio access parameters includes one or more of a coverage enhancement level, a UE category, a maximum bandwidth, or a maximum transport block size. Messaging component 645 may receive messages from at least one UE 115, the messages indicating successful reception of the broadcast or unicast content at the at least one UE 115.

Radio access parameter modifier 650 may modify the set of radio access parameters based on the received messages. Transmitter 620 may transmit signals generated by other components of the device. In some examples, the transmitter 620 may be collocated with a receiver 610 in a transceiver module. For example, the transmitter 620 may be an example of aspects of the transceiver 835 as described with reference to FIG. 8. The transmitter 620 may include a single antenna, or it may include a set of antennas.

Figure 7:
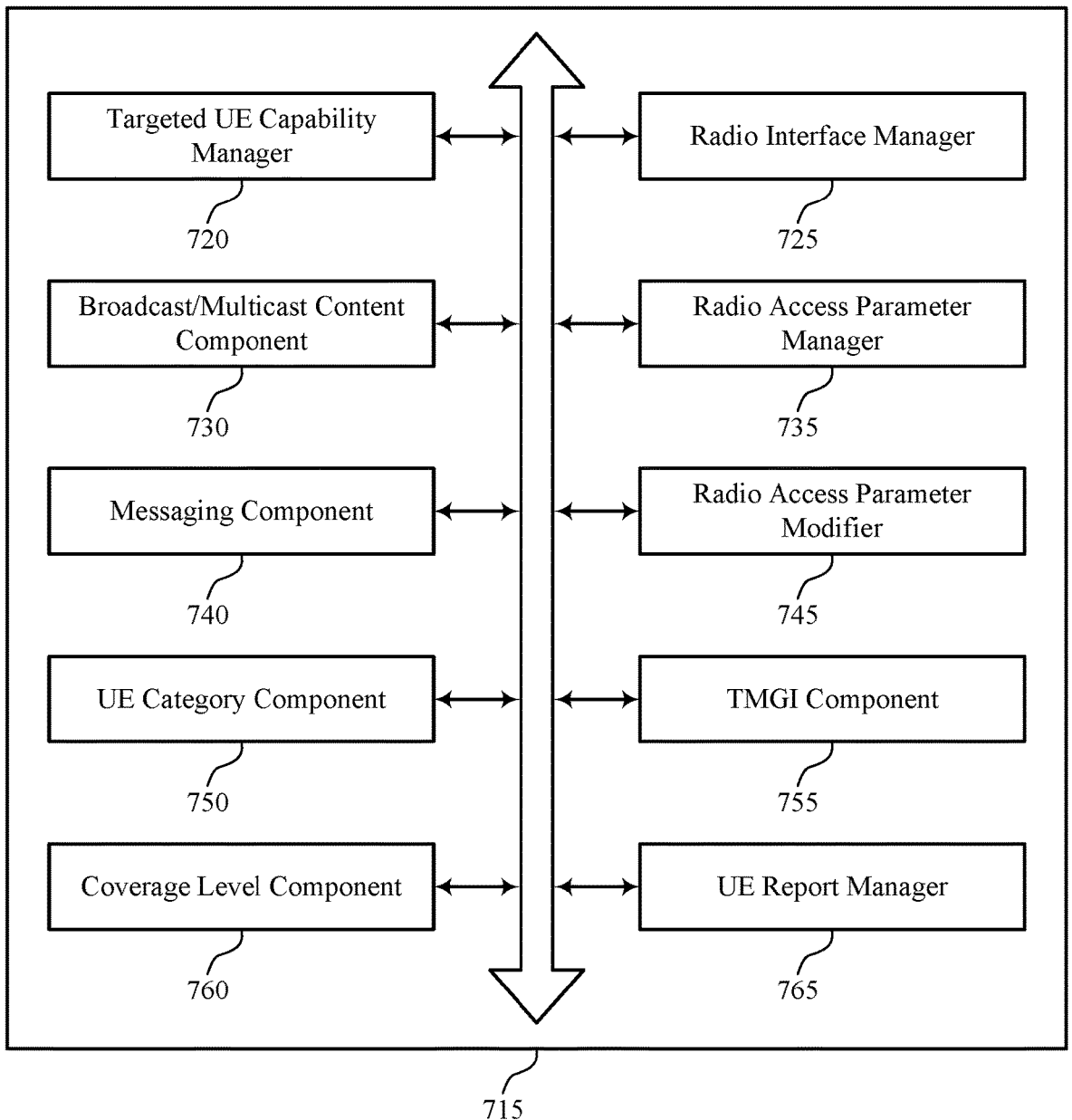
FIG. 7 shows a block diagrams of a base station capability and coverage manager that supports capability and coverage determination for multimedia broadcast multicast services in accordance with aspects of the present disclosure.

FIG. 7 shows a block diagram 700 of a base station capability and coverage manager 715 that supports capability and coverage determination for multimedia broadcast multicast services in accordance with aspects of the present disclosure. The base station capability and coverage manager 715 may be an example of aspects of a base station capability and coverage manager 515, a base station capability and coverage manager 615, or a base station capability and coverage manager 815 as described with reference to FIGS. 5, 6, and 8. The base station capability and coverage manager 715 may include targeted UE capability manager 720, radio interface manager 725, broadcast/multicast content component 730, radio access parameter manager 735, messaging component 740, radio access parameter modifier 745, UE category component 750, TMGI component 755, coverage level component 760, and UE report manager 765. Each of these modules may communicate, directly or indirectly, with one another (e.g., via one or more buses).

Targeted UE capability manager 720 may receive an indication of a targeted UE capability, the targeted UE capability specified by a service provider for the delivery of broadcast or multicast content and associated with a radio interface between the base station 105 and a UE 115 and receive an updated indication of a targeted UE capability from the network node, the radio interface modified based on the updated targeted UE capability. In some cases, the indication of the targeted UE capability may include a QCI. In some cases, the indication of the targeted UE capability may be received from a service provider.

Radio interface manager 725 may configure the radio interface based on the received indication of the targeted UE capability and configure the radio interface based on the received indication of the expected coverage level, the received indication of the targeted UE capability including the indication of the expected coverage level. In some cases, configuring the radio interface based on the received indication of the targeted UE capability includes determining a maximum bandwidth, or a maximum transport block size, or a combination thereof to be used to transmit the broadcast or multicast content.

Broadcast/multicast content component 730 may transmit the broadcast or multicast content to the UE 115 using the configured radio interface. Radio access parameter manager 735 may determine a set of radio access parameters to be used to deliver broadcast or unicast content and transmit the set of radio access parameters to a network node. In some cases, the set of radio access parameters includes one or more of a coverage enhancement level, a UE category, a maximum bandwidth, or a maximum transport block size.

Messaging component 740 may receive messages from at least one UE 115, the messages indicating successful reception of the broadcast or unicast content at the at least one UE 115. Radio access parameter modifier 745 may modify the set of radio access parameters based on the received messages. UE category component 750 may receive, from a network node, a category of the UE 115, the indication of the targeted UE capability including the category. In some cases, the network node includes a BMSC, or a MBMS-GW, or a combination thereof.

TMGI component 755 may receive, from a network node, one or more TMGIs, the one or more TMGIs including the indication of the targeted UE capability and determine a category of the UE based on the received TMGI, the targeted UE capability including the determined category. Coverage level component 760 may receive, from a network node, an indication of an expected coverage level specified by the service provider. UE report manager 765 may transmit UE reports to a network node.

Figure 8:
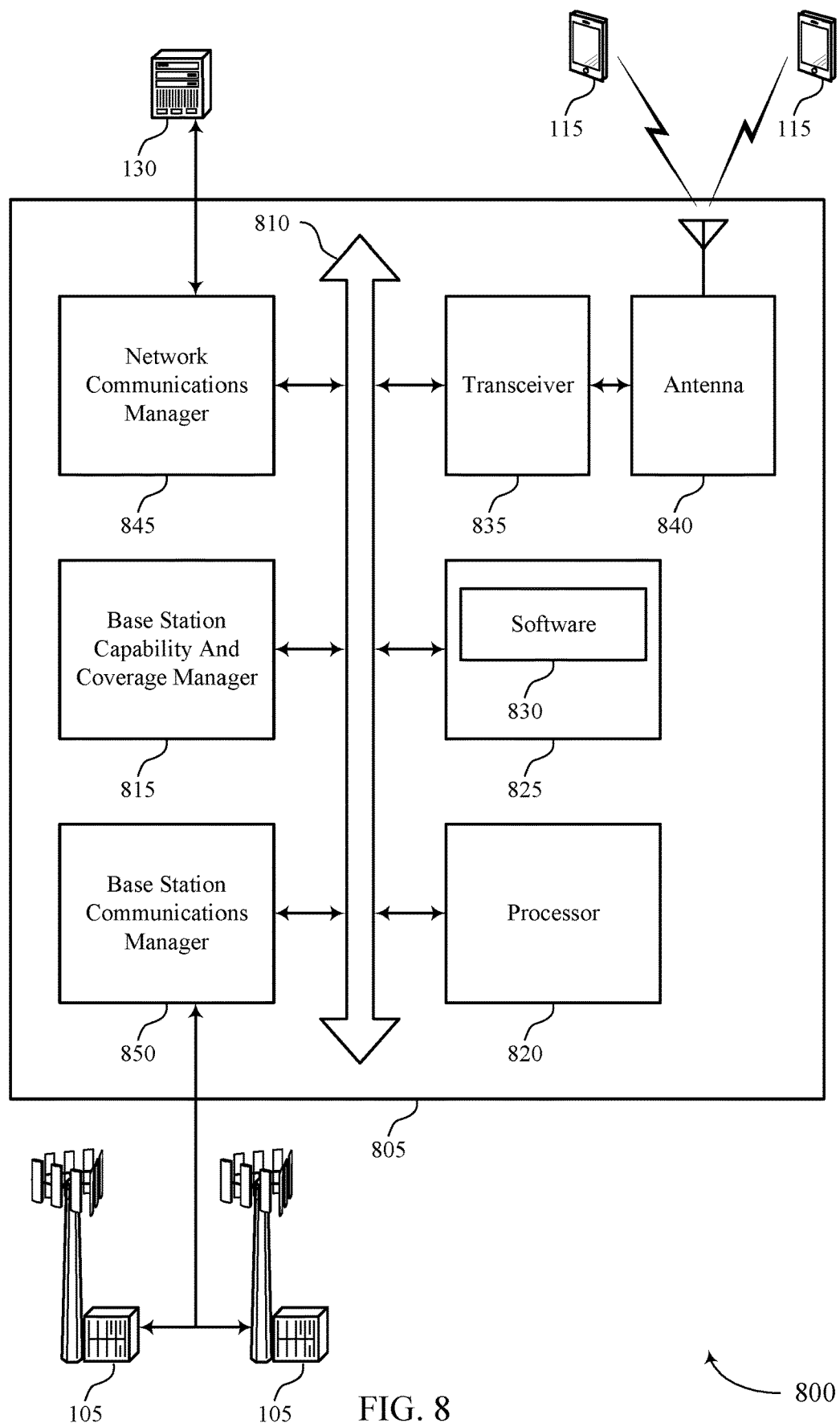
FIG. 8 illustrates a block diagram of a system including a device that supports capability and coverage determination for multimedia broadcast multicast services in accordance with aspects of the present disclosure.

FIG. 8 illustrates a block diagram of a system 800 including a device 805 that supports capability and coverage determination for multimedia broadcast multicast services in accordance with aspects of the present disclosure. Device 805 may be an example of or include the components of wireless device 505, wireless device 605, or a base station 105 as described above, e.g., with reference to FIGS. 1, 5 and 6. Device 805 may include components for bi-directional voice and data communications including components for transmitting and receiving communications, including base station capability and coverage manager 815, processor 820, memory 825, software 830, transceiver 835, antenna 840, network communications manager 845, and base station communications manager 850. These components may be in electronic communication via one or more busses (e.g., bus 810). Device 805 may communicate wirelessly with one or more UEs 115.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting capability and coverage determination for multimedia broadcast multicast services).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support capability and coverage determination for multimedia broadcast multicast services. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions. Network communications manager 845 may manage communications with the core network (e.g., via one or more wired backhaul links). For example, the network communications manager 845 may manage the transfer of data communications for client devices, such as one or more UEs 115.

Base station communications manager 850 may manage communications with other base station 105, and may include a controller or scheduler for controlling communications with UEs 115 in cooperation with other base stations 105. For example, the base station communications manager 850 may coordinate scheduling for transmissions to UEs 115 for various interference mitigation techniques such as beamforming or joint transmission. In some examples, base station communications manager 850 may provide an X2 interface within a LTE or LTE-A wireless communication network technology to provide communication between base stations 105.

Figure 9:
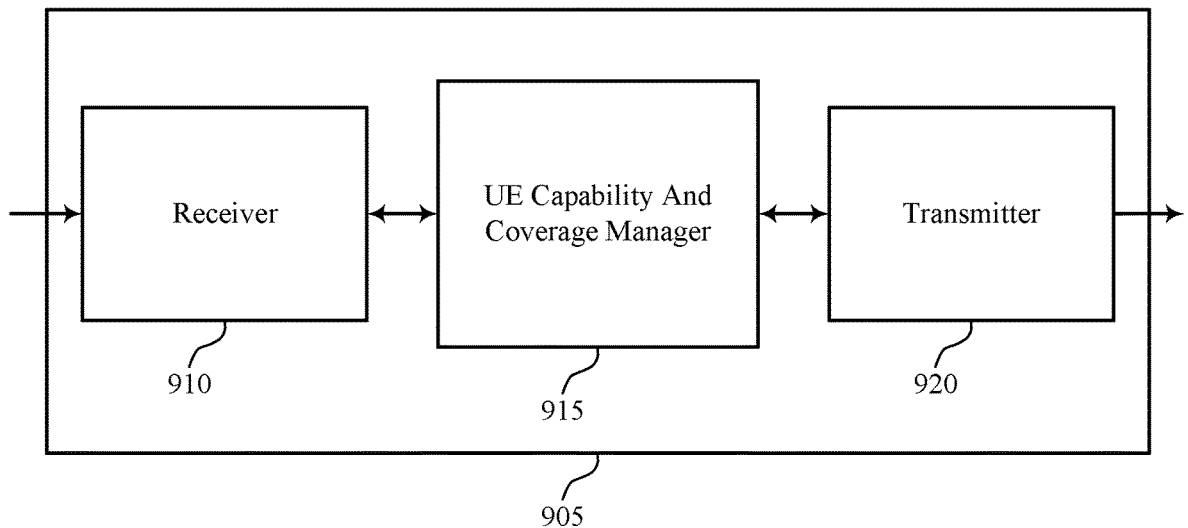
FIGS. 9 and 10 show block diagrams of wireless devices that support capability and coverage determination for multimedia broadcast multicast services in accordance with aspects of the present disclosure.

FIG. 9 shows a block diagram 900 of a wireless device 905 that supports that supports capability and coverage determination for multimedia broadcast multicast services in accordance with aspects of the present disclosure. Wireless device 905 may be an example of aspects of a UE 115 as described with reference to FIG. 1. wireless device 905 may include receiver 910, UE capability and coverage manager 915, and transmitter 920. wireless device 905 may also include a processor. Each of these components may be in communication with one another (e.g., via one or more buses).

Receiver 910 may receive information such as packets, user data, or control information associated with various information channels (e.g., control channels, data channels, and information related to capability and coverage determination for multimedia broadcast multicast services, etc.). Information may be passed on to other components of the device. The receiver 910 may be an example of aspects of the transceiver 1235 as described with reference to FIG. 12.

UE capability and coverage manager 915 may be an example of aspects of the UE capability and coverage manager 1215 as described with reference to FIG. 12. UE capability and coverage manager 915 and/or at least some of its various sub-components may be implemented in hardware, software executed by a processor, firmware, or any combination thereof. If implemented in software executed by a processor, the functions of the UE capability and coverage manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The UE capability and coverage manager 915 and/or at least some of its various sub-components may be physically located at various positions, including being distributed such that portions of functions are implemented at different physical locations by one or more physical devices. In some examples, UE capability and coverage manager 915 and/or at least some of its various sub-components may be a separate and distinct component in accordance with various aspects of the present disclosure. In other examples, UE capability and coverage manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE capability and coverage manager 915 may receive an indication of a targeted UE capability for the delivery of broadcast or multicast content and associated with a radio interface between the UE 115 and a base station 105, identify a supported capability of the UE 115, and receive broadcast or multicast content using the radio interface based on the identified supported capability of the UE 115 and on the targeted UE capability. In some cases, the indication of the targeted UE capability may include a QCI. In some cases, the indication of the targeted UE capability may be received from a service provider.

Transmitter 920 may transmit signals generated by other components of the device. In some examples, the transmitter 920 may be collocated with a receiver 910 in a transceiver module. For example, the transmitter 920 may be an example of aspects of the transceiver 1235 as described with reference to FIG. 12. The transmitter 920 may include a single antenna, or it may include a set of antennas.

Figure 10:
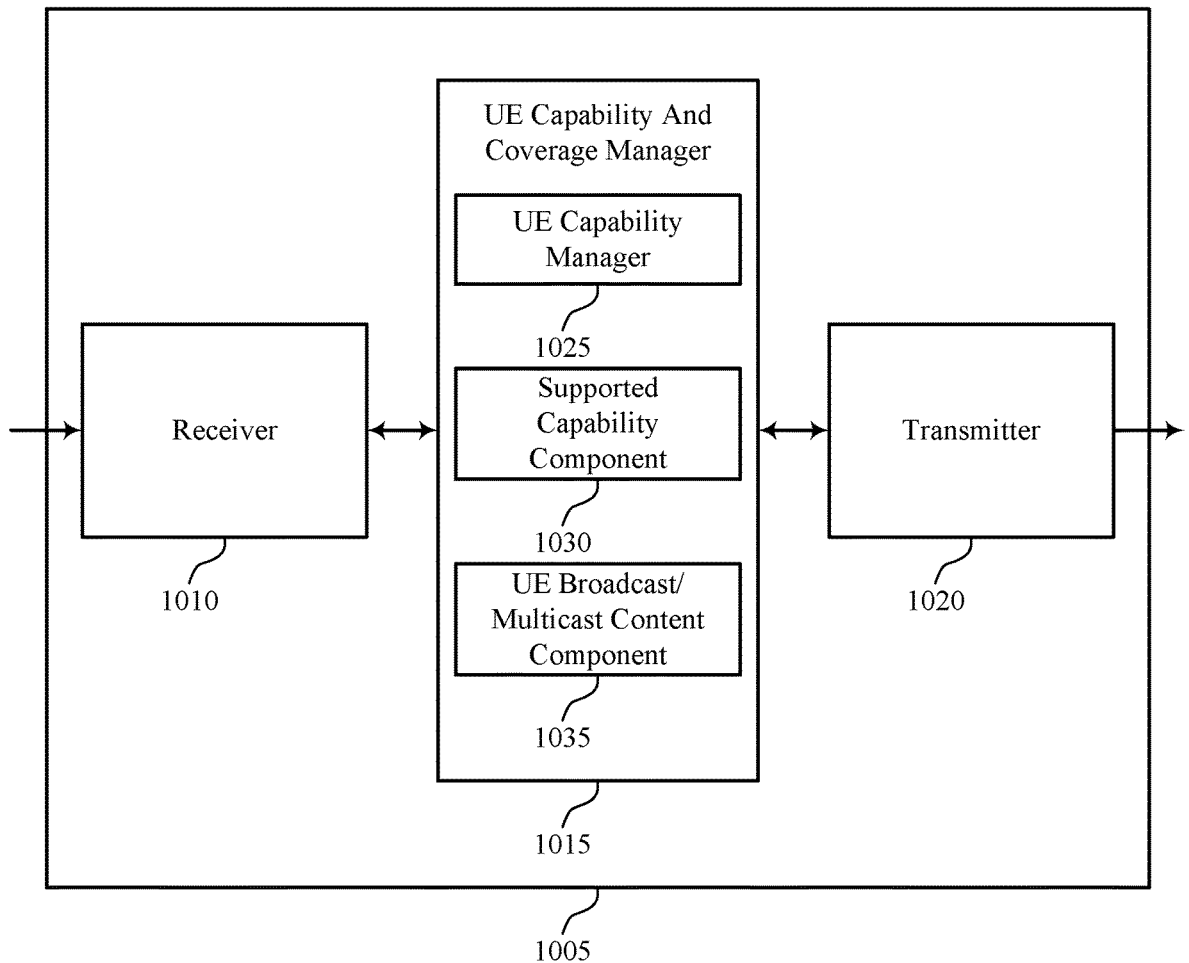

FIG. 10 shows a block diagram 1000 of a wireless device 1005 that supports capability and coverage determination for multimedia broadcast multicast services in accordance with aspects of the present disclosure. Wireless device 1005 may be an example of aspects of a wireless device 905 or a UE 115 as described with reference to FIGS. 1 and 9. wireless device 1005 may include receiver 1010, UE capability and coverage manager 1015, and transmitter 1020. wireless device 1005 may also include a processor. Each of these components may be in communication with one another (e.g., via one or more buses).

Receiver 1010 may receive information such as packets, user data, or control information associated with various information channels (e.g., control channels, data channels, and information related to capability and coverage determination for multimedia broadcast multicast services, etc.). Information may be passed on to other components of the device. The receiver 1010 may be an example of aspects of the transceiver 1235 as described with reference to FIG. 12.

UE capability and coverage manager 1015 may be an example of aspects of the UE capability and coverage manager 1215 as described with reference to FIG. 12. UE capability and coverage manager 1015 may also include UE capability manager 1025, supported capability component 1030, and UE broadcast/multicast content component 1035.

UE capability manager 1025 may receive an indication of a targeted UE capability for the delivery of broadcast or multicast content and associated with a radio interface between the UE 115 and a base station 105. In some cases, the indication of the targeted UE capability is received from a service provider. In some cases, the targeted UE capability is a UE category or a UE coverage enhancement level. In some cases, receiving the indication of the targeted UE capability includes: receiving the indication of the targeted UE capability in one or more of a USD, a SC-MCCH, or a SIB. In some cases, receiving the indication of the targeted UE capability includes: receiving the indication of the targeted UE capability in a transmission formatted based on a minimum supported capability of the UE 115. In some cases, the targeted UE capability includes one or more of a maximum supported capability of the UE 115 targeted by a service provider or an actual supported capability of the UE 115 targeted by the service provider.

Supported capability component 1030 may identify a supported capability of the UE 115 and determine if the supported capability is compatible with the targeted UE capability. UE broadcast/multicast content component 1035 may receive broadcast or multicast content using the radio interface based on the identified supported capability of the UE 115 and on the targeted UE capability.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 as described with reference to FIG. 12. The transmitter 1020 may include a single antenna, or it may include a set of antennas.

Figure 11:
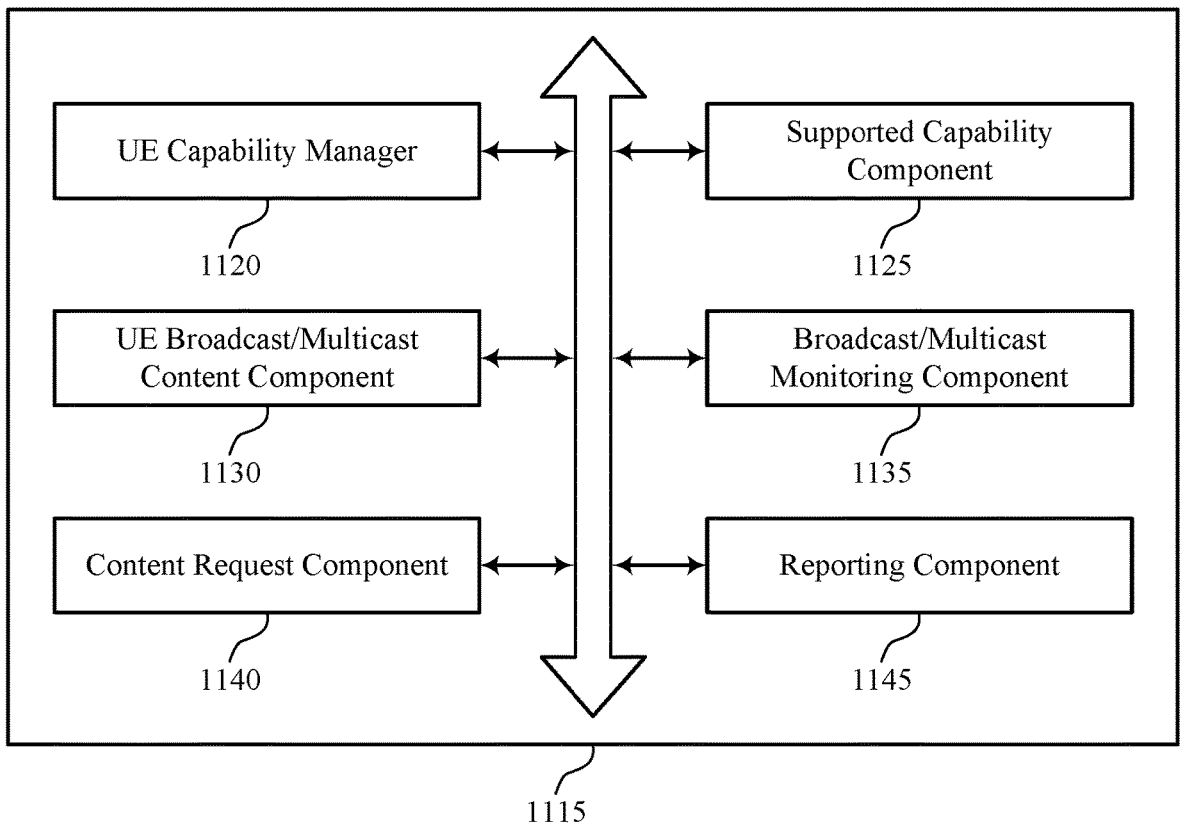
FIG. 11 shows a block diagrams of a UE capability and coverage manager that supports capability and coverage determination for multimedia broadcast multicast services in accordance with aspects of the present disclosure.

FIG. 11 shows a block diagram 1100 of a UE capability and coverage manager 1115 that supports capability and coverage determination for multimedia broadcast multicast services in accordance with aspects of the present disclosure. The UE capability and coverage manager 1115 may be an example of aspects of a UE capability and coverage manager 1215 as described with reference to FIGS. 9, 10, and 12. The UE capability and coverage manager 1115 may include UE capability manager 1120, supported capability component 1125, UE broadcast/multicast content component 1130, broadcast/multicast monitoring component 1135, content request component 1140, and reporting component 1145. Each of these modules may communicate, directly or indirectly, with one another (e.g., via one or more buses).

UE capability manager 1120 may receive an indication of a targeted UE capability for the delivery of broadcast or multicast content and associated with a radio interface between the UE 115 and a base station 105. In some cases, the indication of the targeted UE capability is received from a service provider. In some cases, the targeted UE capability is a UE category or a UE coverage enhancement level. In some cases, receiving the indication of the targeted UE capability includes: receiving the indication of the targeted UE capability in one or more of a USD, a SC-MCCH, or a SIB. In some cases, receiving the indication of the targeted UE capability includes: receiving the indication of the targeted UE capability in a transmission formatted based on a minimum supported capability of the UE 115. In some cases, the targeted UE capability includes one or more of a maximum supported capability of the UE targeted by a service provider or an actual supported capability of the UE 115 targeted by the service provider.

Supported capability component 1125 may identify a supported capability of the UE 115 and determine if the supported capability is compatible with the targeted UE capability. UE broadcast/multicast content component 1130 may receive broadcast or multicast content using the radio interface based on the identified supported capability of the UE 115 and on the targeted UE capability. Broadcast/multicast monitoring component 1135 may determine to monitor for the broadcast or multicast content based on determining that the supported capability is compatible with the targeted UE capability and monitor for a DCI format based on the SC-MCCH.

Content request component 1140 may transmit, by the UE 115, a request for content to a content provider, the request for content including a category of the UE 115, where the received indication of the targeted UE capability is based on the category of the UE 115. Reporting component 1145 may transmit a report indicating successful receipt of the broadcast or multicast content.

Figure 12:
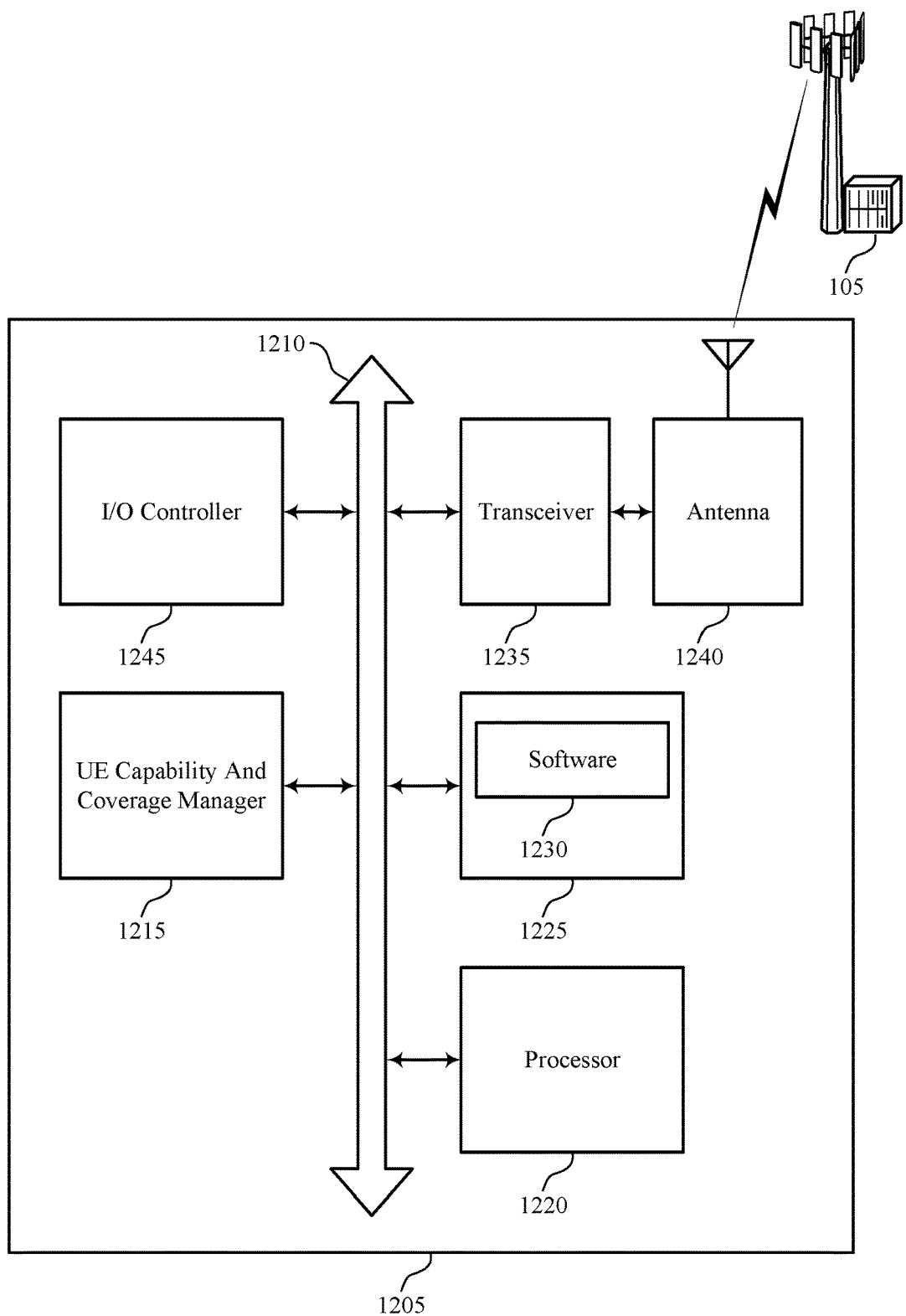
FIG. 12 illustrates a block diagram of a system including a device that supports capability and coverage determination for multimedia broadcast multicast services in accordance with aspects of the present disclosure.

FIG. 12 illustrates a block diagram of a system 1200 including a device 1205 that supports capability and coverage determination for multimedia broadcast multicast services in accordance with aspects of the present disclosure. Device 1205 may be an example of or include the components of UE 115 as described above, e.g., with reference to FIG. 1. Device 1205 may include components for bi-directional voice and data communications including components for transmitting and receiving communications, including UE capability and coverage manager 1215, processor 1220, memory 1225, software 1230, transceiver 1235, antenna 1240, and I/O controller 1245. These components may be in electronic communication via one or more busses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220.

Processor 1220 may be configured to execute computer-readable instructions stored in a memory to perform various functions (e.g., functions or tasks supporting capability and coverage determination for multimedia broadcast multicast services).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support capability and coverage determination for multimedia broadcast multicast services. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
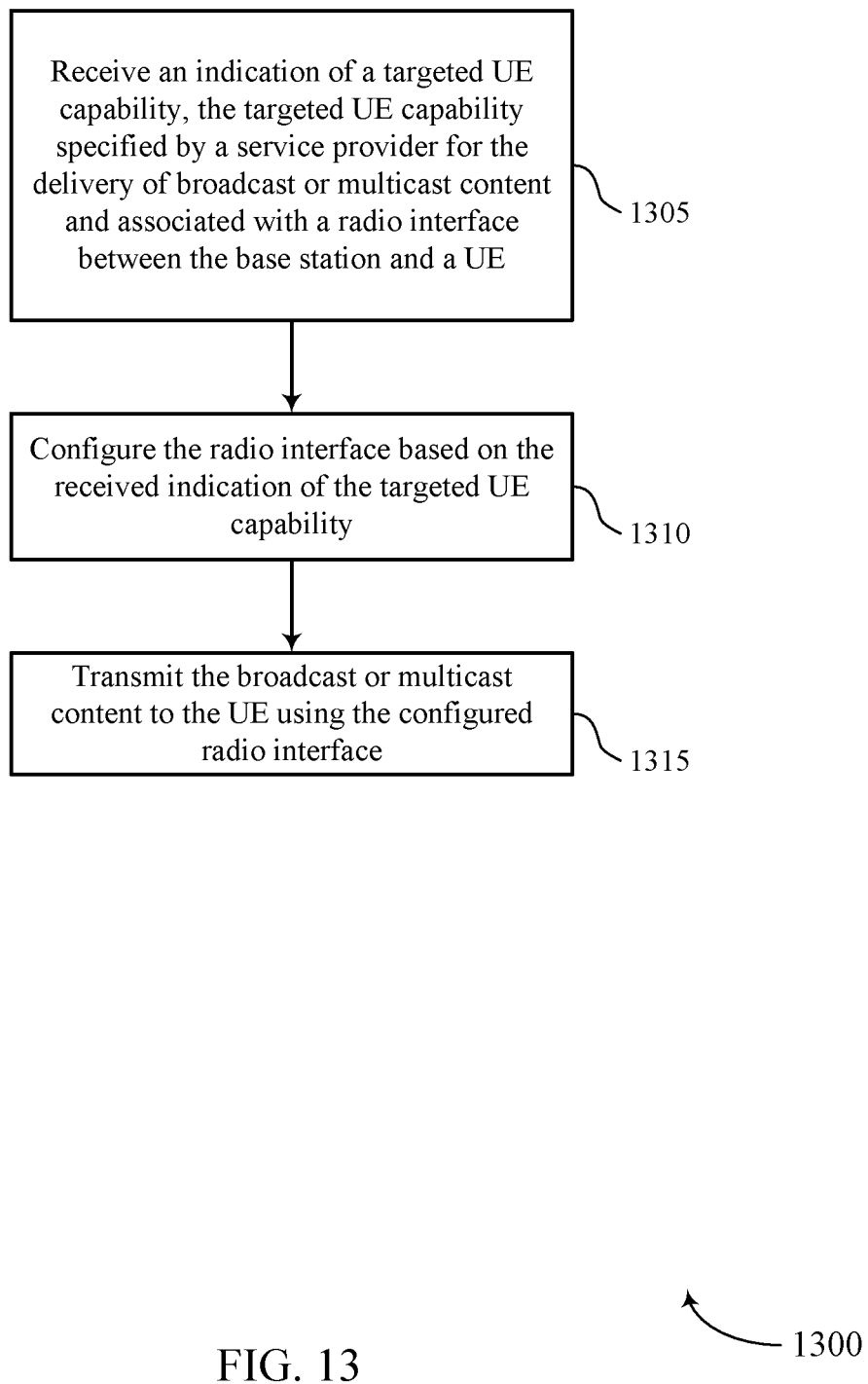
FIGS. 13 through 17 show flowcharts illustrating methods for capability and coverage determination for multimedia broadcast multicast services in accordance with aspects of the present disclosure.

FIG. 13 shows a flowchart illustrating a method 1300 for capability and coverage determination for multimedia broadcast multicast services in accordance with aspects of the present disclosure. The operations of method 1300 may be implemented by a base station 105 or its components as described herein. For example, the operations of method 1300 may be performed by a base station capability and coverage manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1305 the base station 105 may receive an indication of a targeted UE capability, the targeted UE capability specified by a service provider for the delivery of broadcast or multicast content and associated with a radio interface between the base station 105 and a UE 115. The operations of block 1305 may be performed according to the methods as described with reference to FIGS. 1 through 4. In certain examples, aspects of the operations of block 1305 may be performed by a targeted UE capability manager as described with reference to FIGS. 5 through 8.

At block 1310 the base station 105 may configure the radio interface based at least in part on the received indication of the targeted UE capability. The operations of block 1310 may be performed according to the methods as described with reference to FIGS. 1 through 4. In certain examples, aspects of the operations of block 1310 may be performed by a radio interface manager as described with reference to FIGS. 5 through 8.

At block 1315 the base station 105 may transmit the broadcast or multicast content to the UE 115 using the configured radio interface. The operations of block 1315 may be performed according to the methods as described with reference to FIGS. 1 through 4. In certain examples, aspects of the operations of block 1315 may be performed by a broadcast/multicast content component as described with reference to FIGS. 5 through 8.

Figure 14:
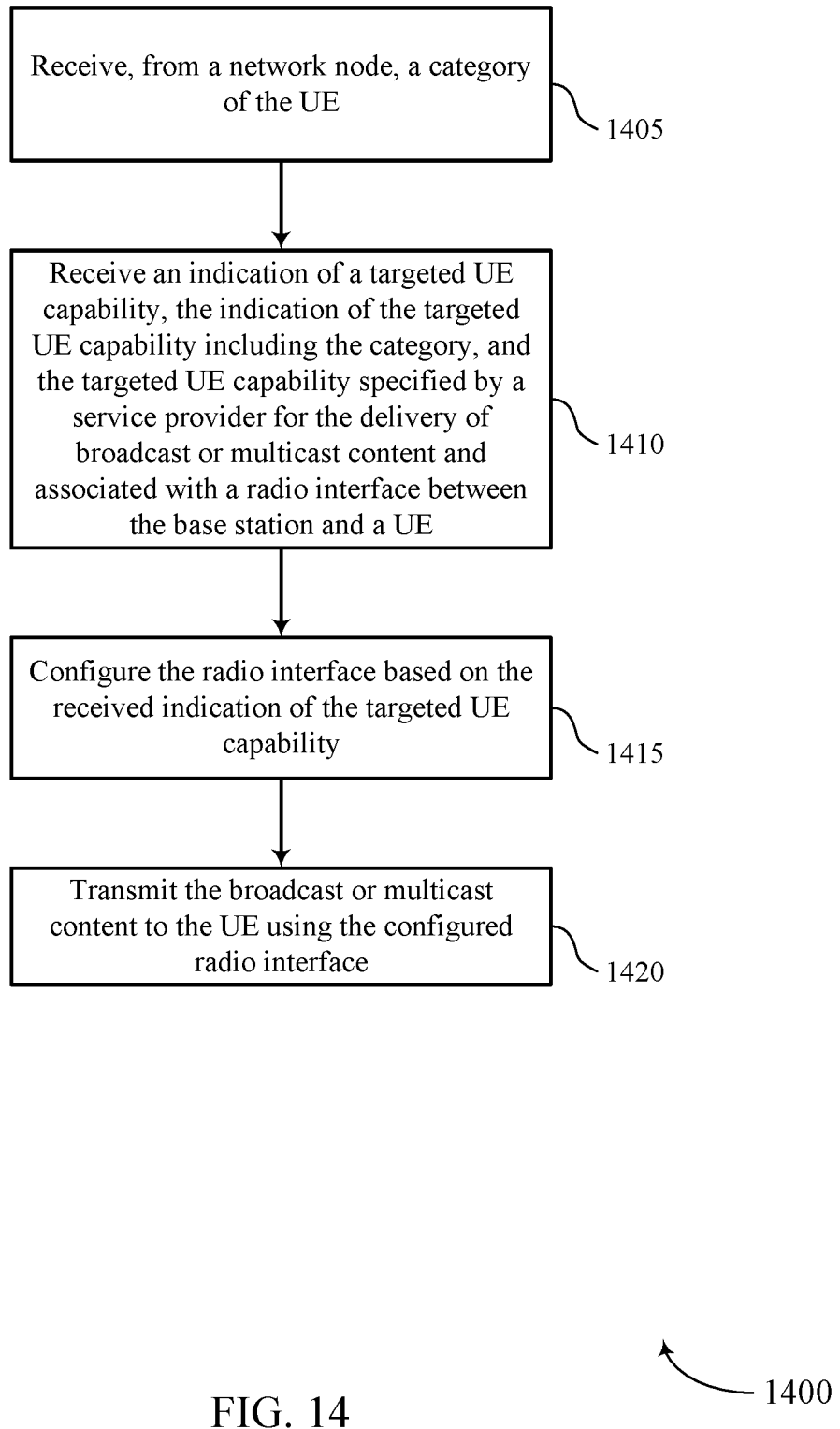

FIG. 14 shows a flowchart illustrating a method 1400 for capability and coverage determination for multimedia broadcast multicast services in accordance with aspects of the present disclosure. The operations of method 1400 may be implemented by a base station 105 or its components as described herein. For example, the operations of method 1400 may be performed by a base station capability and coverage manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may receive, from a network node, a category of the UE 115. The operations of block 1405 may be performed according to the methods as described with reference to FIGS. 1 through 4. In certain examples, aspects of the operations of block 1405 may be performed by a UE category component as described with reference to FIGS. 5 through 8.

At block 1410 the base station 105 may receive an indication of a targeted UE capability, where the indication of the targeted UE capability may include the category, and the targeted UE capability specified by a service provider for the delivery of broadcast or multicast content and associated with a radio interface between the base station 105 and a UE 115. In some cases, the indication of the targeted UE capability may include a QCI. In some cases, the base station 105 may identify a aping between the QCI and a maximum bandwidth, or a maximum transport block size, or a combination thereof, and configure the radio interface based on the identified mapping. The operations of block 1410 may be performed according to the methods as described with reference to FIGS. 1 through 4. In certain examples, aspects of the operations of block 1410 may be performed by a targeted UE capability manager as described with reference to FIGS. 5 through 8.

At block 1415 the base station 105 may configure the radio interface based at least in part on the received indication of the targeted UE capability. The operations of block 1415 may be performed according to the methods as described with reference to FIGS. 1 through 4. In certain examples, aspects of the operations of block 1415 may be performed by a radio interface manager as described with reference to FIGS. 5 through 8.

At block 1420 the base station 105 may transmit the broadcast or multicast content to the UE 115 using the configured radio interface. The operations of block 1420 may be performed according to the methods as described with reference to FIGS. 1 through 4. In certain examples, aspects of the operations of block 1420 may be performed by a broadcast/multicast content component as described with reference to FIGS. 5 through 8.

Figure 15:
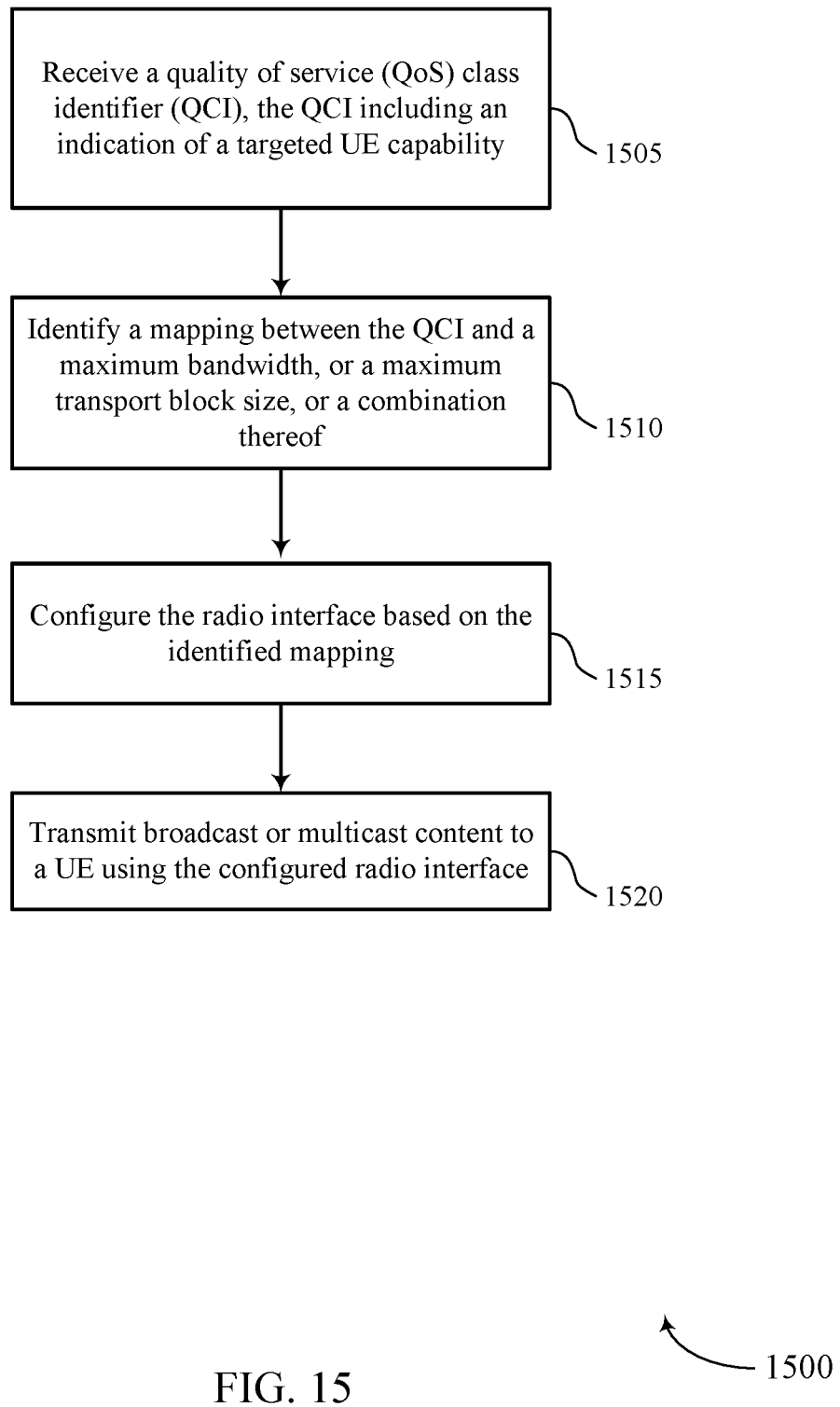

FIG. 15 shows a flowchart illustrating a method 1500 for capability and coverage determination for multimedia broadcast multicast services in accordance with aspects of the present disclosure. The operations of method 1500 may be implemented by a base station 105 or its components as described herein. For example, the operations of method 1500 may be performed by a base station capability and coverage manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may receive a QCI, the QCI including an indication of a targeted UE capability. The operations of block 1505 may be performed according to the methods as described with reference to FIGS. 1 through 4. In certain examples, aspects of the operations of block 1505 may be performed by a base station capability and coverage manager as described with reference to FIGS. 5 through 8.

At block 1510 the base station 105 may identify a mapping between the QCI and a maximum bandwidth, or a maximum transport block size, or a combination thereof. In some cases, the base station 105 may derive the maximum bandwidth and the maximum transport block size based on the mapping with the QCI. The operations of block 1510 may be performed according to the methods as described with reference to FIGS. 1 through 4. In certain examples, aspects of the operations of block 1510 may be performed by a base station capability and coverage manager as described with reference to FIGS. 5 through 8.

At block 1515 the base station 105 may configure the radio interface based on the identified mapping. The operations of block 1515 may be performed according to the methods as described with reference to FIGS. 1 through 4. In certain examples, aspects of the operations of block 1515 may be performed by a radio interface manager as described with reference to FIGS. 5 through 8.

At block 1520 the base station 105 may transmit broadcast or multicast content to a UE 115 using the configured radio interface. The operations of block 1520 may be performed according to the methods as described with reference to FIGS. 1 through 4. In certain examples, aspects of the operations of block 1520 may be performed by a broadcast/multicast content component as described with reference to FIGS. 5 through 8.

Figure 16:
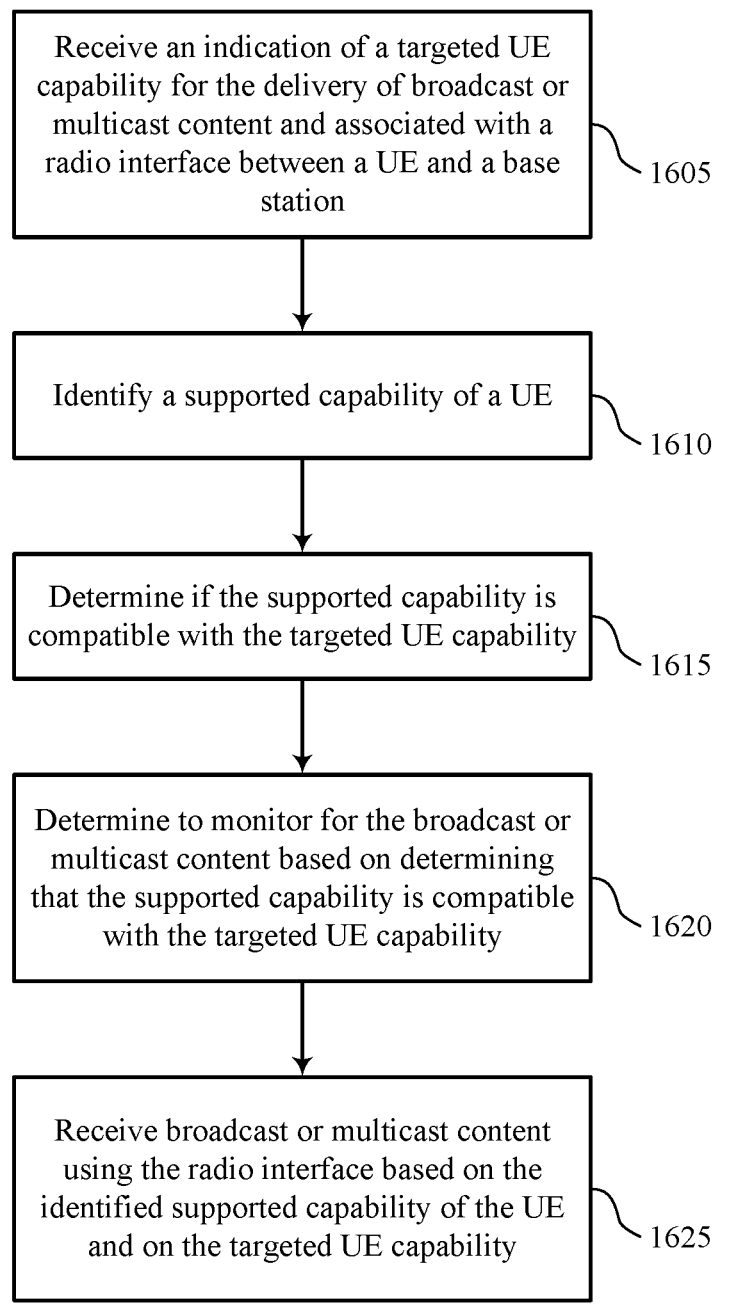

FIG. 16 shows a flowchart illustrating a method 1600 for capability and coverage determination for multimedia broadcast multicast services in accordance with aspects of the present disclosure. The operations of method 1600 may be implemented by a UE 115 or its components as described herein. For example, the operations of method 1600 may be performed by a UE capability and coverage manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive an indication of a targeted UE capability for the delivery of broadcast or multicast content and associated with a radio interface between the UE 115 and a base station 105. In some cases, the indication of the targeted UE capability may include a QCI. The operations of block 1605 may be performed according to the methods as described with reference to FIGS. 1 through 4. In certain examples, aspects of the operations of block 1605 may be performed by a UE capability manager as described with reference to FIGS. 9 through 12.

At block 1610 the UE 115 may identify a supported capability of the UE 115. The operations of block 1610 may be performed according to the methods as described with reference to FIGS. 1 through 4. In certain examples, aspects of the operations of block 1610 may be performed by a supported capability component as described with reference to FIGS. 9 through 12.

At block 1615 the UE 115 may determine if the supported capability is compatible with the targeted UE capability. The operations of block 1615 may be performed according to the methods as described with reference to FIGS. 1 through 4. In certain examples, aspects of the operations of block 1615 may be performed by a supported capability component as described with reference to FIGS. 9 through 12.

At block 1620 the UE 115 may determine to monitor for the broadcast or multicast content based on determining that the supported capability is compatible with the targeted UE capability. The operations of block 1620 may be performed according to the methods as described with reference to FIGS. 1 through 4. In certain examples, aspects of the operations of block 1620 may be performed by a broadcast/multicast monitoring component as described with reference to FIGS. 9 through 12.

At block 1625 the UE 115 may receive broadcast or multicast content using the radio interface based at least in part on the identified supported capability of the UE 115 and on the targeted UE capability. The operations of block 1625 may be performed according to the methods as described with reference to FIGS. 1 through 4. In certain examples, aspects of the operations of block 1625 may be performed by a UE broadcast/multicast content component as described with reference to FIGS. 9 through 12.

Figure 17:
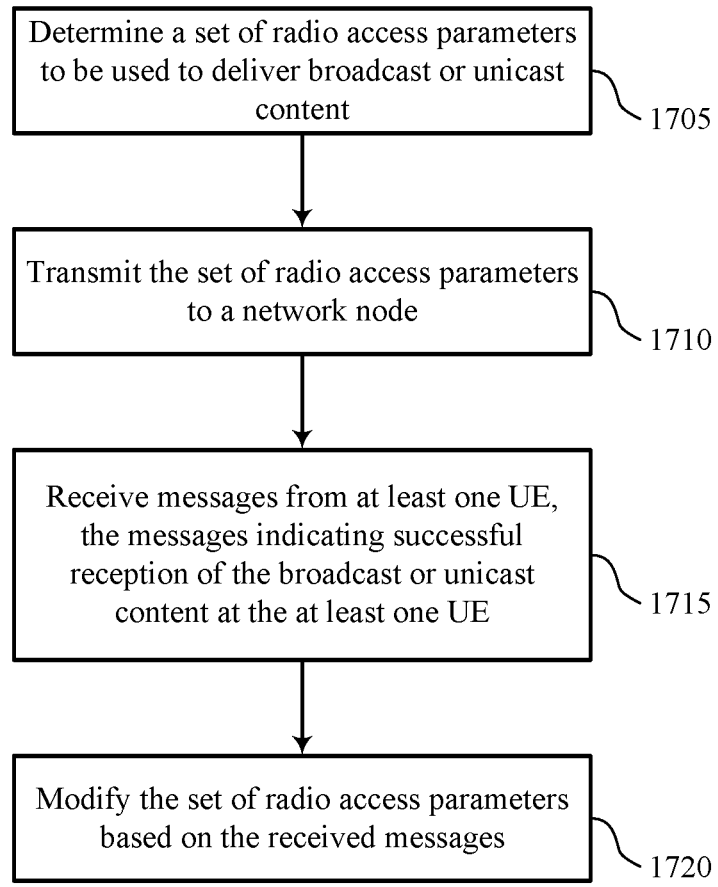

FIG. 17 shows a flowchart illustrating a method 1700 for capability and coverage determination for multimedia broadcast multicast services in accordance with aspects of the present disclosure. The operations of method 1700 may be implemented by a base station 105 or its components as described herein. For example, the operations of method 1700 may be performed by a base station capability and coverage manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may determine a set of radio access parameters to be used to deliver broadcast or unicast content. The operations of block 1705 may be performed according to the methods as described with reference to FIGS. 1 through 4. In certain examples, aspects of the operations of block 1705 may be performed by a radio access parameter manager as described with reference to FIGS. 5 through 8.

At block 1710 the base station 105 may transmit the set of radio access parameters to a network node. The operations of block 1710 may be performed according to the methods as described with reference to FIGS. 1 through 4. In certain examples, aspects of the operations of block 1710 may be performed by a radio access parameter manager as described with reference to FIGS. 5 through 8.

At block 1715 the base station 105 may receive messages from at least one UE 115, the messages indicating successful reception of the broadcast or unicast content at the at least one UE 115. The operations of block 1715 may be performed according to the methods as described with reference to FIGS. 1 through 4. In certain examples, aspects of the operations of block 1715 may be performed by a messaging component as described with reference to FIGS. 5 through 8.

At block 1720 the base station 105 may modify the set of radio access parameters based at least in part on the received messages. The operations of block 1720 may be performed according to the methods as described with reference to FIGS. 1 through 4. In certain examples, aspects of the operations of block 1720 may be performed by a radio access parameter modifier as described with reference to FIGS. 5 through 8.

In some examples, aspects from two or more of the described methods may be combined. It should be noted that the methods are just example implementations, and that the operations of the methods may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) radio frequency spectrum bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 as described with reference to FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone;

B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a network device, comprising:
   receiving a quality of service class indicator (QCI) specified by a service provider for communication of Multimedia Broadcast Multicast Service (MBMS) content;
   configuring a radio interface between the network device and a UE associated with a UE category based at least in part on one or more radio parameters for the communication of the MBMS content, wherein the UE category is based at least in part on the QCI and is associated with the one or more radio parameters; and
   transmitting the MBMS content to the UE using the configured radio interface.

2. The method of claim 1, further comprising:
   identifying a mapping between the QCI and a maximum bandwidth, or a maximum transport block size, or a combination thereof; and
   configuring the radio interface based at least in part on the identified mapping.

3. The method of claim 1, wherein configuring the radio interface based at least in part on the one or more radio parameters comprises:
   determining a maximum bandwidth, or a maximum transport block size, or a combination thereof to be used to transmit the MBMS content.

4. The method of claim 1, further comprising:
   receiving, from a network node, an indication of an expected coverage level specified by the service provider; and
   configuring the radio interface based at least in part on the received indication of the expected coverage level.

5. The method of claim 1, further comprising:
   transmitting UE reports to a network node; and
   receiving an updated QCI from the network node, the radio interface modified based at least in part on the updated QCI.

6. A method for wireless communication at a user equipment (UE), comprising:
   receiving an indication of a targeted UE capability of associated with a radio interface between the UE and a network device, the radio interface based at least in part on one or more radio parameters for communication of Multimedia Broadcast Multicast Service (MBMS) content, wherein the targeted UE capability is based at least in part on a quality of service class indicator (QCI) for the UE; and
   receiving MBMS content using the radio interface based at least in part on the one or more radio parameters and the targeted UE capability.

7. The method of claim 6, wherein the indication of the targeted UE capability comprises the QCI.

8. The method of claim 6, wherein the indication of the targeted UE capability is received from a service provider.

9. The method of claim 6, further comprising:
   determining to monitor for the MBMS content based at least in part on the targeted UE capability.

10. The method of claim 6, wherein receiving the indication of the targeted UE capability comprises receiving the indication of the targeted UE capability in one or more of a single cell multipoint control channel (SC-MCCH), a user service description, or a system information block.

11. The method of claim 10, further comprising:
    determining the targeted UE capability based at least in part on the SC-MCCH; and
    monitoring for a downlink control information (DCI) format based at least in part on the targeted UE capability.

12. The method of claim 6, wherein receiving the indication of the targeted UE capability comprises receiving the indication of the targeted UE capability in a transmission formatted based at least in part on a minimum supported capability of the UE.

13. The method of claim 6, wherein the targeted UE capability comprises a maximum supported capability of the UE targeted by a service provider, or a minimum supported capability of the UE targeted by a service provider, or an actual supported capability of the UE targeted by the service provider, or a combination thereof.

14. The method of claim 6, further comprising transmitting a report indicating successful receipt of the MBMS content.

15. The method of claim 6, wherein the UE category is associated with the one or more radio parameters.

16. An apparatus for wireless communication at a network device, comprising:
 means for receiving a quality of service class indicator (QCI) specified by a service provider for communication of Multimedia Broadcast Multicast Service (MBMS) content;
 means for configuring a radio interface between the network device and a UE associated with a UE category based at least in part on one or more radio parameters for the communication of the MBMS content, wherein the UE category is based at least in part on the QCI and is associated with the one or more radio parameters; and
 means for transmitting the MBMS content to the UE using the configured radio interface.

17. The apparatus of claim 16, further comprising:
 means for identifying a mapping between the QCI and a maximum bandwidth, or a maximum transport block size, or a combination thereof; and
 means for configuring the radio interface based at least in part on the identified mapping.

18. The apparatus of claim 16, wherein the means for configuring the radio interface based at least in part on the one or more radio parameters comprises determining a maximum bandwidth, or a maximum transport block size, or a combination thereof to be used to transmit the MBMS content.

19. The apparatus of claim 16, further comprising:
 means for receiving, from a network node, an indication of an expected coverage level specified by the service provider; and
 means for configuring the radio interface based at least in part on the received indication of the expected coverage level.

20. The apparatus of claim 16, further comprising:
 transmitting UE reports to a network node; and
 receiving an updated QCI from the network node, the radio interface modified based at least in part on the updated QCI.

* * * * *